United States Patent Office 3,717,655
Patented Feb. 20, 1973

3,717,655
1-(β-ARYL)ETHYL-IMIDAZOLE DERIVATIVES
Erik Fred Godefroi, Nachtegalenstraat, and Jan Heeres, Turnhout, Belgium, assignors to Janssen Pharmaceutica N.V.
No Drawing. Continuation-in-part of application Ser. No. 753,729, Aug. 19, 1968. This application July 23, 1969, Ser. No. 848,767
Int. Cl. C07d 49/00
U.S. Cl. 260—309                           8 Claims

ABSTRACT OF THE DISCLOSURE

The compounds are of the class of 1-(β-aryl)ethyl-imidazole ethers and amines useful for their anti-fungal and anti-bacterial activity.

---

This is a continuation-in-part of our formerly copending application, Ser. No. 753,729, filed Aug. 19, 1968, now abandoned.

This invention relates to novel imidazole derivatives and, more particularly, to 1-(β-aryl)ethyl-imidazole ethers and amines having the following formula:

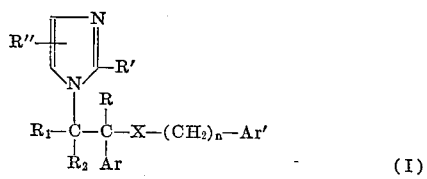

(I)

wherein:

R, $R_1$ and $R_2$ are each a member selected from the group consisting of hydrogen and lower alkyl;
X is a member selected from the group consisting of oxy and NH;
$n$ is the integer zero, 1 or 2;
Ar is a member selected from the group consisting of phenyl, substituted phenyl, thienyl and halothienyl, said substituted phenyl containing at least one phenyl substituent selected from the group consisting of halo, lower alkyl and lower alkoxy;
Ar' is a member selected from the group consisting of phenyl, substituted phenyl and α-tetralyl, said substituted phenyl containing at least one phenyl substituent selected from the group consisting of halo, lower alkyl, lower alkoxy, cyano, nitro and amino;
R' is a member selected from the group consisting of hydrogen, methyl and ethyl; and
R" is a member selected from the group consisting of hydrogen and methyl;

provided that:

(i) when said X is NH, then said R is hydrogen;
(ii) when said Ar' is a substituted phenyl containing at least one phenyl substituent selected from the group consisting of nitro and amino, then said X is oxy and said $n$ is zero;
(iii) when said Ar' is α-tetralyl, then said X is NH and said $n$ is zero; and (iv) when said X is oxy and said Ar' is a member selected from the group consisting of phenyl and substituted phenyl containing at least one phenyl substituent selected from the group consisting of halo, lower alkyl, lower alkoxy and cyano, then said $n$ is other than zero.

The therapeutically active acid addition salts of the foregoing compounds (I) are also embraced within the scope of this invention.

As used therein, "lower alkyl" and "lower alkoxy" may be straight or branch chained saturated hydrocarbons having from 1 to about 6 carbons, such as, for example, methyl, ethyl, propyl, isopropyl, butyl, pentyl, hexyl and the like alkyls, and, respectively, the corresponding alkoxys such as methoxy, ethoxy, propoxy, isopropoxy, etc. The preferred lower alkyl and lower alkoxy are methyl and methoxy, respectively. The term "halo" refers to halogens of atomic weight less than 127, i.e., fluoro, iodo, bromo and chloro. The preferred "substituted phenyls" with regard to the symbol Ar are mono-, di- and trihalophenyl, lower alkylphenyl and lower alkoxyphenyl; and mono-, di- and tri-halophenyl, mono- and di-(lower alkyl) phenyl, lower alkoxyphenyl, cyanophenyl, mono- and di-nitrophenyl and aminophenyl with regard to the symbol Ar'.

The amines of Formula I, that is, when —X— is

—NH— are readily obtained by the reductive amination of an appropriate 1-(aroyl-methyl)-imidazole of Formula II, wherein $R_1$, $R_2$, R', R" and Ar are as previously described, for example, by treating such ketone (II) with an appropriate amine of Formula III, wherein $n$ and Ar' are as previously described, in a suitable solvent, e.g., an aromatic hydrocarbon such as benzene, toluene, xylene and the like. Preferably, the amination is conducted under reflux conditions and in the presence of a small amount of an appropriate acid, e.g., p-toluenesulfonic acid. After the evolution of water has ceased, the aromatic hydrocarbon solvent is evaporated off and the residual product (IV) is transferred to a lower alkanol solvent and reduced to the corresponding amine (I–a), for example, by treatment with a suitable reducing agent, such as a complex metal hydride, e.g., potassium borohydride, odium borohydride and the like, or by catalytic hydrogenation, e.g., by contact with hydrogen and a palladium-on-charcoal catalyst. The amine product is easily recovered from the reaction mixture according to conventional isolation procedures either as the free base, or, if so desired, in the form of an acid addition salt by treatment of the base with a suitable acid.

The foregoing reductive amination sequence may be further illustrated by the following schematic diagram:

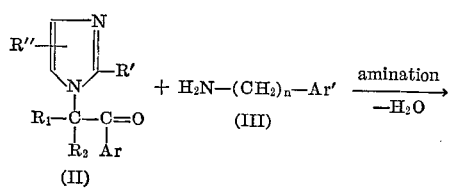

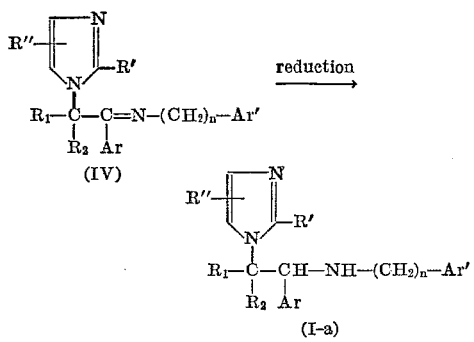

(IV)

(I-a)

The ethers of Formula I, that is, when —X— is oxy, are easily prepared by the O-alkylation of an appropriate α-Ar-imidazole-1-ethanol of Formula V, wherein R, $R_1$, $R_2$, R', R" and Ar are as previously described, for example, by contacting such alcohol (V), the hydroxyl of which has been preliminarily converted to alkali metal salt form by treatment with an appropriate strong base such as an alkali metal amide or hydride, with an appropriate halide of Formula VI, wherein $n$ is as previously described, Y is halo, preferably chloro or bromo, and Ar' is as previously described with the exception of aminophenyl. Suitable solvents for the O-alkylation procedure include the aromatic hydrocarbons, e.g., benzene, toluene, xylene and the like; the dialkylformamides, e.g., dimethylformamide and diethylformamide; ethers such as tetrahydrofuran, 1,2 - dimethoxyethane and the like; and hexamethylphosphortriamide. Elevated temperatures may be advantageously employed to accelerate the rate of reaction. As with the amines of Formula I–a, the resulting ethers I–b are easily recovered in the form of the free base or as an acid addition salt. The foregoing O-alkylation procedure may be illustrated by the following schematic diagram:

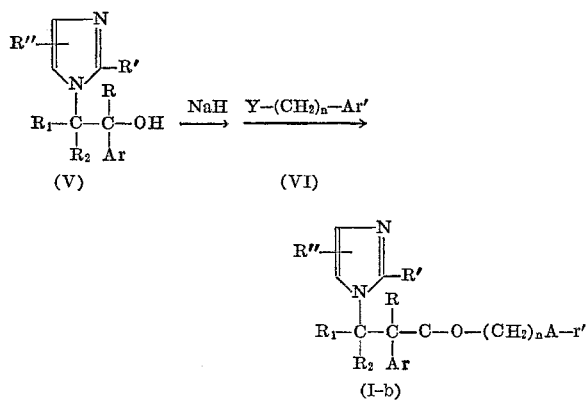

The Formula I ethers, wherein Ar' is aminophenyl, are obtained by reduction of the corresponding nitrophenyl ethers of Formula I–b according to conventional procedures for reducing a nitro function to an amino function, for example, by catalytic hydrogenation, such as by contact with hydrogen and a palladium-on-charcoal catalyst in ethanol, or by contact with nascent hydrogen, such as is produced by the action of an appropriate metal and acid, e.g., zinc and acetic acid, iron and aqueous ammonium chloride, tin and hydrochloric acid, and the like.

The starting ketones (II) may be prepared by several methods of synthesis. For example, the ketone (II) are obtainable from the following processes; wherein the symbols $R_1$, $R_2$, Y, R', R" and Ar are as previously defined:

(A) The known material, N-acetyl-imidazole [see W. Otting, Ber. 89, 1940 (1956)], is contacted with a compound of the formula Y—$CH_2$—CO—Ar in a suitable organic solvent, e.g., acetonitrile, and preferably under reflux conditions for a few hours. The solvent is subsequently evaporated off and the residue dissolved in water, filtering if necessary. The aqueous solution is treated with an appropriate base, e.g., sodium bicarbonate solution, until about pH 9 to precipitate the corresponding ketone: 1-aroylmethyl-imidazole. If desired, the resulting ketone may be dissolved in a suitable organic solvent and reprecipitated as an acid addition salt by conventional treatment with an acid; or (B) 2-R'-4(5)-R"-Imidazole and a halide of the formula Y—$CH_1R_2$—CO—Ar are intimately contacted in a suitable solvent, e.g., dimethylformamide, lower alkanol and the like, from which mixture the desired ketone is precipitated by addition of water. Alternatively, a ketone of the formula $HCR_1R_2$—CO—Ar is first brominated with liquid bromine according to conventional techniques to yield the compound Br—$CR_1R_2$—CO—Ar which is then reacted with said 2-R'-4(5)-R"-imidazole;

(C) The known material, ethyl 5-methylimidazole-4-carboxylate, in the form of an alkali metal salt, preferably sodium, is intimately contacted under reflux conditions with an appropriate 2-bromomethyl - 2 - Ar-1,3-dioxolan of the formula:

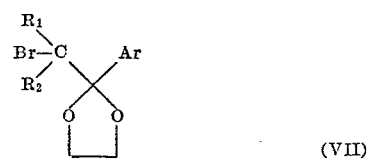

(VII)

in a suitable solvent, e.g., dimethylformamide, and in the presence of potassium iodide. The thus-obtained product, ethyl 1-(2-Ar - 1,3 - dioxolan - 2 - ylmethyl)-5-methyl-imidazole-4-carboxylate:

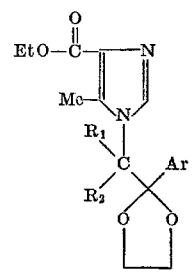

is then extracted from the reaction mixture with a suitable solvent, e.g., ether, the evaporation of which affords the ester, or, alternatively, the ester may be precipitated out by treating the extract with an acid such as nitric acid. Conventional hydrolysis of the resulting ester or ester salt yields the corresponding 4-carboxylic acid derivative which is then decarboxylated using standard techniques, for example, by heating (about 250° C.) a mixture of the acid in paraffin oil until evolution of carbon dioxide ceases. The thus-obtained 1-(2-Ar - 1,3 - dioxolan-2-yl-methyl)-5-methylimidazole:

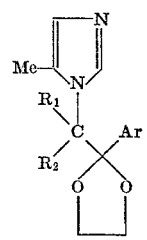

which may be recovered by extraction and precipitation similar to the aforementioned 4-carboxylate ester, is then hydrolyzed, preferably under acidic conditions, to convert the dioxolan function to a carbonyl function and thereby yield the desired 5-methyl ketone of Formula II:

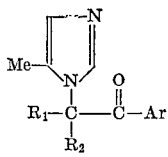

The starting alcohols (V) are also obtainable from several methods of synthesis such as the following processes; wherein the symbols R, $R_1$, $R_2$, Y, R', R'' and Ar are as previously defined;

(A) The carbonyl function of the ketones (II) is reduced to a carbinol function by contact with a suitable reducing agent, for example, sodium borohydride, lithium aluminum hydride, and the like, in a suitable solvent, e.g., a lower alkanol; or (B) 2—R'—4(5)—R''—imidazole, in the form of an alkali metal salt, such as is obtained by treatment with sodium methoxide, is contacted with a compound of the formula Y—$CR_1R_2$—CR(OH)—Ar in a suitable organic solvent, e.g., dimethylformamide. Subsequent addition of water to the reaction mixture precipitates the desired alcohol which is then isolated by conventional techniques; or (C) 2—R'—4(5)—R''—imidazole is contacted with a compound of the formula

in a suitable organic solvent, e.g., a lower alkanol, and in the presence of a small amount of organic base, e.g., pyridine, to yield, as a precipitate upon the addition of water, the corresponding alcohol of Formula V, in which R, $R_1$ and $R_2$ all equal hydrogen.

Several of the reactant halides of Formula VII have been reported in the literature [Feugeas Cl., Bull. Soc. Chim. Fr., 1963(II), 2568; and Patel, A. R., J. Pharm. Sc., 52(6), 588–593 (1963)]. Those that are not heretofore known may be easily prepared by first brominating a ketone of the formula: $CH_3$—CO—Ar, wherein Ar is as previously defined, according to conventional bromination procedures and then reacting the thus obtained bromide with ethylene glycol in a suitable organic solvent, e.g., an aromatic hydrocarbon such as benzene, toluene, xylene and the like, to which a small amount of p-toluenesulfonic acid may be added. The following diagrammatic scheme further illustrates the foregoing reactions:

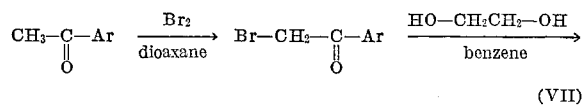

(VII)

Due to the available asymmetric carbons present in the subject compounds (I), it is evident that their existence in the form of stereochemical isomers (enantiomorphs) is possible. If desired, the resolution and isolation or the production of a particular form can be accomplished by application of the general principles known in the art. Said enantiomorphs are naturally intended to be included within the scope of this invention.

Depending upon the conditions employed during the course of the reactions, the novel compounds herein are obtained either in the form of the free bases or salts thereof. The salts are converted to the free basis in the usual manner, e.g., by reaction with alkali such as sodium or potassium hydroxide. The compounds in base form may be converted to their therapeutically useful acid addition salts by reaction with an appropriate acid, as, for example, an inorganic acid such as hydrohalic acid, i.e., hydrochloric, hydrobromic or hydroiodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicylic, 2-phenoxybenzoic or 2-acetoxy benzoic acid.

The subject compounds of Formula I and the acid addition salts thereof are useful agents in combatting fungi and bacteria as demonstrated by their broad spectrum of anti-fungal and anti-bacterial action. The data given in the following tables illustrate such activity. The method employed in obtaining the tabulated data is that reported by Vanbreuseghem et al., Chemotherapia, 12, 107 (1967).

The tests on fungi were performed using Sabouraud's liquid medium (1 g. of neopeptone Difco and 2 g. of glucose Difco per 100 ml. distilled water) in 16 x 160 mm. test tubes, each containing 4.5 ml. of liquid medium, autoclaved at 120° C. for 15 minutes. The drug to be tested is primarily dissolved in ethanol 50% at a concentration of 20 mg./ml. and afterwards diluted with sterile distilled water in order to obtain a concentration of 10 mg./ml. Successive decimal dilutions were made in distilled water. To each tube, containing 4.5 ml. of Sabouraud's liquid medium, 0.5 ml. of a dilution of the drug was added in order to obtain 1000γ, 500γ, 100γ, 10γ and 1γ per ml. medium (the symbol "γ" equals "micrograms"). A control tube was prepared by adding 0.5 ml. distilled water to 4.5 ml. medium. The concentration of ethanol in the control tubes was the same as in those containing 1000γ and 500γ/ml. of the drug. The filamentous fungi were incubated at 25° C. for two to three weeks. A square block of 2 mm. side was cut and inoculated in the liquid medium. A three day old culture on Sabouraud's liquid medium was used for yeasts. The inoculum was 0.05 ml. per tube. All the cultures were made in duplicate and incubated at 25° C. for 14 days. The first readings were made after 7 days and the final ones after 14 days (the data given in Tables I and II are the final scores observed after 14 days for each compound at the concentration of 100 micrograms per milliliter culture). The score was established assuming a maximum growth for the control tube which was given score 4. The complete absence of growth after 14 days was scored 0, while growths equal to ¼, ½ and ¾ of the controls were rated respectively 1, 2 and 3.

The tests on bacteria were performed on phenol red dextron broth medium (Difco) and on trypton broth medium (Difco) using the same decimal dilution technique as for fungistatic tests (100γ/ml. and 10γ/ml.). The inoculum size are 0.1 ml. from a 24 hours culture diluted 1/10 in distilled water for Streptococcus pyogenes and 0.05 ml. for the other organisms. The results after 72 hours were rated as + or 0, corresponding to the presence of the absence of growth. The data given in Table III hereafter illustrate such anti-bacterial action.

It is understood that the compounds in the following tables are not listed for purposes of limiting the invention thereto, but only to exemplify the useful properties of all the compounds within the scope of Formula I, including the pharmaceutically acceptable acid addition salts thereof.

TABLE I.—AMINE-DERIVATIVES

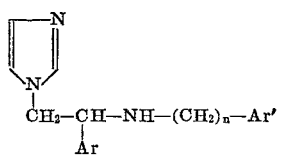

| Ar | n | Ar' | Salt | 1[1] | 2 | 3 | 4 | 5 | 6 | 7 | 8 | 9 | 10 | 11 |
|---|---|---|---|---|---|---|---|---|---|---|---|---|---|---|
| C$_6$H$_5$ | 1 | C$_6$H$_5$ | 2 HCl | 1 | 0 | 0 | 3 | 4 | 4 | 4 | 4 | 4 | 3 | 4 |
| C$_6$H$_5$ | 2 | C$_6$H$_5$ | 2 HNO$_3$ | 1 | 0 | 0 | 3 | 3 | 4 | 4 | 4 | 4 | 3 | 3 |
| C$_6$H$_5$ | 0 | C$_6$H$_5$ | 2 HCl | 1 | 0 | 0 | 3 | 3 | 4 | 4 | 4 | 4 | 4 | 3 |
| C$_6$H$_5$ | 0 | C$_{10}$H$_{11}$ [2] | 2 HNO$_3$ | 0 | 0 | 0 | 2 | 0 | 4 | 0 | 4 | 4 | 0 | 3 |
| C$_6$H$_5$ | 1 | 4-Cl—C$_6$H$_4$ | 2 HCl | 0 | 0 | 0 | 1 | 0 | 3 | 1 | 4 | 1 | 0 | 1 |
| C$_6$H$_5$ | 2 | C$_6$H$_5$ | 2 HCl | 0 | 0 | 0 | 2 | 3 | 4 | 4 | 4 | 4 | 3 | 4 |
| C$_6$H$_5$ | 1 | 2-Cl—C$_6$H$_4$ | 2 HCl | 0 | 0 | 0 | 1 | 0 | 4 | 0 | 4 | 4 | 0 | 2 |
| 4-CH$_3$—C$_6$H$_4$ | 1 | 4-Cl—C$_6$H$_4$ | 2 HCl | 0 | 0 | 0 | 0 | 0 | 2 | 0 | 0 | 0 | 0 | 0 |
| 4-Cl—C$_6$H$_4$ | 1 | 4-OCH$_3$—C$_6$H$_4$ | 2 HCl | 0 | 0 | 0 | 1 | 0 | 4 | 1 | 4 | 4 | 4 | 1 |
| 4-CH$_3$—C$_6$H$_4$ | 1 | 4-OCH$_3$—C$_6$H$_4$ | 2 HCl | 0 | 0 | 0 | 1 | 2 | 4 | 3 | 4 | 4 | 4 | 2 |
| 4-CH$_3$—C$_6$H$_4$ | 2 | C$_6$H$_5$ | 2 HNO$_3$ | 0 | 0 | 0 | 2 | 1 | 4 | 2 | 4 | 4 | 4 | 2 |
| 4-Cl—C$_6$H$_4$ | 0 | C$_6$H$_5$ | 2 HCl | 0 | 0 | 0 | 1 | 0 | 3 | 1 | 4 | 4 | 0 | 0 |
| 4-Cl—C$_6$H$_4$ | 1 | 2-Cl—C$_6$H$_4$ | 2 HCl | 0 | 0 | 0 | 0 | 0 | 2 | 0 | 0 | 4 | 3 | 1 |
| 4-Cl—C$_6$H$_4$ | 2 | C$_6$H$_5$ | 2 HNO$_3$ | 0 | 0 | 0 | 1 | 0 | 0 | 0 | 4 | 4 | 0 | 0 |
| C$_6$H$_5$ | 1 | 4-CH$_3$—C$_6$H$_4$ | 2 HCl | 0 | 0 | 0 | 3 | 0 | 4 | 3 | 4 | 4 | 1 | 1 |
| C$_6$H$_5$ | 1 | 4-OCH$_3$—C$_6$H$_4$ | 2 HCl | 0 | 0 | 0 | 3 | 3 | 4 | 4 | 4 | 3 | 2 |
| 4-Cl—C$_6$H$_4$ | 1 | 4-CH$_3$—C$_6$H$_4$ | 2 HCl | 4 | 1 | 1 | 4 | 4 | 4 | 4 | 4 | 4 | 4 | 4 |
| 4-Cl—C$_6$H$_4$ | 0 | C$_{10}$H$_{11}$ [2] | 2HCl.3H$_2$O | 0 | 0 | 0 | 1 | 0 | 3 | 0 | 0 | 3 | 0 | 0 |
| 4-F—C$_6$H$_4$ | 1 | C$_6$H$_5$ | 2 HNO$_3$ | 1 | 0 | 0 | 2 | 1 | 3 | 3 | 4 | 4 | 3 | 3 |
| 4-F—C$_6$H$_4$ | 1 | 2-Cl—C$_6$H$_4$ | 2 HNO$_3$ | 0 | 0 | 0 | 2 | 0 | 3 | 0 | 4 | 3 | 3 | 3 |
| 4-F—C$_6$H$_4$ | 1 | 4-OCH$_3$—C$_6$H$_4$ | 2 HNO$_3$ | 0 | 0 | 0 | 3 | 2 | 4 | 2 | 4 | 4 | 2 | 2 |
| 4-F—C$_6$H$_4$ | 2 | C$_6$H$_5$ | 2 HNO$_3$ | 0 | 0 | 0 | 2 | 2 | 3 | 3 | 4 | 3 | 1 | 3 |
| 4-F—C$_6$H$_4$ | 1 | 4-CH$_3$—C$_6$H$_4$ | 2 HNO$_3$ | 0 | 0 | 0 | 2 | 1 | 3 | 0 | 4 | 3 | 0 | 1 |
| 4-F—C$_6$H$_4$ | 0 | C$_{10}$H$_{11}$ [2] | 2 HNO$_3$ | 0 | 0 | 0 | 2 | 0 | 2 | 1 | 4 | 4 | 0 | 1 |
| 4-F—C$_6$H$_4$ | 1 | 4-Cl—C$_6$H$_4$ | 2 HNO$_3$ | 0 | 0 | 0 | 1 | 0 | 1 | 0 | 0 | 0 | 0 | 1 |
| C$_4$H$_3$S [3] | 1 | 4-Cl—C$_6$H$_4$ | 2 HCl | 0 | 0 | 0 | 0 | 0 | 2 | 1 | 4 | 0 | 0 | 0 |

[1] 1=*Microsporum canis*; 2=*Trichophyton mentagrophytes*; 3=*Trichophyton rubrum*; 4=*Phialophora verrucosa*; 5=*Cryptococcus neoformans*; 6=*Candida tropicalis*; 7=*Candida albicans*; 8=*Mucor*; 9=*Aspergillus fumigatus*; 10=*Sporotrichum schenckii*; 11=*Saprolegnia*.
[2] C$_{10}$H$_{11}$=α-tetralyl.
[3] C$_4$H$_3$S=2-thienyl.

TABLE II-A.—ETHER-DERIVATIVES

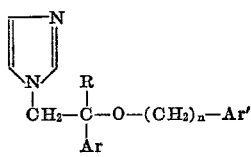

| Ar | R | n | Ar' | Salt | 1[1] | 2 | 3 | 4 | 5 | 6 | 7 | 8 | 9 | 10 | 11 |
|---|---|---|---|---|---|---|---|---|---|---|---|---|---|---|---|
| C$_6$H$_5$ | H | 1 | 4-Cl—C$_6$H$_4$ | HNO$_3$ | 0 | 0 | 0 | 0 | 0 | 1 | 0 | 1 | 0 | 0 | 0 |
| 4-Cl—C$_6$H$_4$ | H | 1 | 4-Cl—C$_6$H$_4$ | HNO$_3$ | 0 | 0 | 0 | 0 | 0 | 0 | 0 | 0 | 0 | 0 | 0 |
| 4-F—C$_6$H$_4$ | H | 1 | 4-Cl—C$_6$H$_4$ | HNO$_3$ | 0 | 0 | 0 | 1 | 0 | 1 | 0 | 0 | 0 | 0 | 0 |
| 2,4-(Cl)$_2$—C$_6$H$_3$ | H | 1 | 4-Cl—C$_6$H$_4$ | HNO$_3$ | 0 | 0 | 0 | 0 | 0 | 0 | 0 | 0 | 0 | 0 | 0 |
| 2-Cl—C$_6$H$_4$ | H | 1 | 4-Cl—C$_6$H$_4$ | HNO$_3$ | 0 | 0 | 0 | 0 | 0 | 0 | 0 | 0 | 0 | 0 | 0 |
| 2,4-(Cl)$_2$—C$_6$H$_3$ | H | 1 | 2,4-(Cl)$_2$—C$_6$H$_3$ | HNO$_3$ | 0 | 0 | 0 | 2 | 0 | 1 | 1 | 4 | 0 | 0 | 0 |
| 4-F—C$_6$H$_4$ | H | 1 | 2,4-(Cl)$_2$—C$_6$H$_3$ | HNO$_3$ | 0 | 0 | 0 | 0 | 0 | 0 | 0 | 0 | 0 | 0 | 0 |
| 4-CH$_3$—C$_6$H$_4$ | H | 1 | 2,4-(Cl)$_2$—C$_6$H$_3$ | HNO$_3$ | 0 | 0 | 0 | 0 | 0 | 1 | 0 | 0 | 0 | 0 | 0 |
| 2-CH$_3$—C$_6$H$_4$ | H | 1 | 2,4-(Cl)$_2$—C$_6$H$_3$ | HNO$_3$ | 0 | 0 | 0 | 0 | 0 | 1 | 0 | 2 | 0 | 0 | 0 |
| 2-Cl—C$_6$H$_4$ | H | 1 | 4-Cl—C$_6$H$_4$ | HNO$_3$ | 0 | 0 | 0 | 0 | 0 | 1 | 1 | 0 | 0 | 0 | 0 |
| 4-CH$_3$—C$_6$H$_4$ | H | 1 | 4-Cl—C$_6$H$_4$ | HNO$_3$ | 0 | 0 | 0 | 0 | 0 | 1 | 0 | 1 | 0 | 0 | 0 |
| 2-Cl—C$_6$H$_4$ | H | 1 | 2,4-(Cl)$_2$—C$_6$H$_3$ | HNO$_3$ | 0 | 0 | 0 | 0 | 0 | 1 | 1 | 0 | 0 | 0 | 0 |
| 4-Cl—C$_6$H$_4$ | H | 1 | 2,4-(Cl)$_2$—C$_6$H$_3$ | HNO$_3$ | 0 | 0 | 0 | 0 | 0 | 0 | 0 | 1 | 0 | 0 | 0 |
| 4-Cl—C$_6$H$_4$ | H | 1 | 2-Cl—C$_6$H$_4$ | HNO$_3$ | 0 | 0 | 0 | 0 | 0 | 0 | 0 | 0 | 0 | 0 | 0 |
| 4-F—C$_6$H$_4$ | H | 1 | 2-Cl—C$_6$H$_4$ | HNO$_3$ | 0 | 0 | 0 | 1 | 0 | 0 | 0 | 4 | 0 | 0 | 0 |
| 4-Br—C$_6$H$_4$ | H | 1 | 4-Cl—C$_6$H$_4$ | HNO$_3$ | 0 | 0 | 0 | 0 | 0 | 1 | 0 | 0 | 0 | 0 | 0 |
| 2-OCH$_3$—C$_6$H$_4$ | H | 1 | 2,4-(Cl)$_2$—C$_6$H$_3$ | HNO$_3$ | 0 | 0 | 0 | 0 | 0 | 2 | 0 | 4 | 0 | 0 | 0 |
| 4-CH$_3$—C$_6$H$_4$ | H | 1 | 2-Cl—C$_6$H$_4$ | HNO$_3$ | 0 | 0 | 0 | 0 | 0 | 3 | 0 | 4 | 0 | 0 | 0 |
| 2-CH$_3$—C$_6$H$_4$ | H | 1 | 2-Cl—C$_6$H$_4$ | HNO$_3$ | 0 | 0 | 0 | 1 | 1 | 3 | 1 | 4 | 0 | 0 | 0 |
| 2-OCH$_3$—C$_6$H$_4$ | H | 1 | 2-Cl—C$_6$H$_4$ | HNO$_3$ | 0 | 0 | 0 | 1 | 2 | 3 | 1 | 4 | 0 | 0 | 0 |
| 2-Cl—C$_6$H$_4$ | H | 1 | 2-Cl—C$_6$H$_4$ | HNO$_3$ | 0 | 0 | 0 | 0 | 0 | 2 | 0 | 1 | 0 | 0 | 0 |
| 2,4-(Cl)$_2$—C$_6$H$_3$ | H | 1 | 2-Cl—C$_6$H$_4$ | HNO$_3$ | 0 | 0 | 0 | 0 | 0 | 0 | 0 | 0 | 0 | 0 | 0 |
| 4-Br—C$_6$H$_4$ | H | 1 | 2-Cl—C$_6$H$_4$ | HNO$_3$ | 0 | 0 | 0 | 1 | 0 | 0 | 0 | 0 | 0 | 0 | 0 |
| C$_6$H$_5$ | CH$_3$ | 1 | 4-Cl—C$_6$H$_4$ | HNO$_3$ | 0 | 0 | 0 | 0 | 0 | 1 | 0 | 0 | 0 | 0 | 0 |
| C$_6$H$_5$ | CH$_3$ | 1 | 2,4-(Cl)$_2$—C$_6$H$_3$ | HNO$_3$ | 0 | 0 | 0 | 0 | 0 | 3 | 1 | 0 | 0 | 0 | 1 |
| 4-Cl—C$_6$H$_4$ | CH$_3$ | 1 | 4-Cl—C$_6$H$_4$ | HNO$_3$ | 0 | 0 | 0 | 2 | 0 | 2 | 0 | 0 | 0 | 0 | 0 |
| 4-Cl—C$_6$H$_4$ | CH$_3$ | 1 | 2,4-(Cl)$_2$—C$_6$H$_3$ | HNO$_3$ | 0 | 0 | 0 | 2 | 0 | 2 | 1 | 1 | 2 | 0 | 1 |
| C$_4$H$_2$ClS [2] | H | 1 | 2-Cl—C$_6$H$_4$ | HNO$_3$ | 0 | 0 | 0 | 0 | 0 | 0 | 0 | 0 | 0 | 0 | 0 |
| 2,4-(Cl)$_2$—C$_6$H$_3$ | H | 1 | 2-CH$_3$—C$_6$H$_4$ | HNO$_3$ | 0 | 0 | 0 | 0 | 0 | 2 | 0 | 4 | 0 | 0 | 0 |
| 2,4-(Cl)$_2$—C$_6$H$_3$ | H | 1 | 2,6-(Cl)—C$_6$H$_3$ | HNO$_3$ | 0 | 0 | 0 | 0 | 0 | 2 | 0 | 3 | 0 | 0 | 0 |
| C$_6$H$_5$ | H | 1 | C$_6$H$_5$ | HNO$_3$ | 0 | 0 | 0 | 1 | 0 | 3 | 1 | 3 | 0 | 0 | 1 |
| 2,4-(Cl)$_2$—C$_6$H$_3$ | H | 1 | 3-OCH$_3$—C$_6$H$_4$ | HNO$_3$ | 0 | 0 | 0 | 0 | 0 | 3 | 0 | 2 | 0 | 0 | 0 |
| 4-Cl—C$_6$H$_4$ | H | 1 | 2-CH$_3$—C$_6$H$_4$ | HNO$_3$ | 0 | 0 | 0 | 0 | 0 | 1 | 0 | 1 | 0 | 0 | 0 |
| 4-Cl—C$_6$H$_4$ | H | 1 | 2,6-(Cl)$_2$—C$_6$H$_3$ | HNO$_3$ | 0 | 0 | 0 | 0 | 0 | 0 | 1 | 1 | 0 | 0 | 1 |
| 2,4-(Cl)$_2$—C$_6$H$_3$ | H | 0 | 4-NO$_2$—C$_6$H$_4$ | HNO$_3$ | 0 | 0 | 0 | 0 | 0 | 1 | 0 | 0 | 0 | 0 | 0 |
| 2,4-(Cl)$_2$—C$_6$H$_3$ | H | 1 | 4-OCH$_3$—C$_6$H$_4$ | HNO$_3$ | 0 | 0 | 0 | 0 | 0 | 1 | 0 | 1 | 0 | 0 | 0 |
| 4-Cl—C$_6$H$_4$ | H | 1 | 4-CH$_3$—C$_6$H$_4$ | HCl.H$_2$O | 0 | 0 | 0 | 0 | 0 | 2 | 0 | 3 | 0 | 0 | 0 |
| 2,4-(Cl)$_2$—C$_6$H$_3$ | H | 1 | 2-F—C$_6$H$_4$ | HNO$_3$ | 0 | 0 | 0 | 0 | 0 | 1 | 0 | 1 | 0 | 0 | 0 |
| 2,4-(Cl)$_2$—C$_6$H$_3$ | H | 1 | 4-F—C$_6$H$_4$ | HNO$_3$ | 0 | 0 | 0 | 0 | 0 | 0 | 0 | 1 | 0 | 0 | 0 |

TABLE II-A.—ETHER-DERIVATIVES—Continued

| Ar | R | n | Ar' | Salt | Fungistatic activity (final score at 100 μg./ml.) | | | | | | | | | | |
|---|---|---|---|---|---|---|---|---|---|---|---|---|---|---|---|
| | | | | | [1]1 | 2 | 3 | 4 | 5 | 6 | 7 | 8 | 9 | 10 | 11 |
| 2,4-(Cl)$_2$—C$_6$H$_3$ | H | 0 | 2,4-(NO$_2$)$_2$—C$_6$H$_3$ | HNO$_3$ | 1 | 0 | 0 | 1 | 1 | 2 | 2 | 3 | 4 | 2 | 2 |
| 2,4-(Cl)$_2$—C$_6$H$_3$ | H | 0 | 4-NH$_2$—C$_6$H$_4$ | Base | 0 | 0 | 0 | 2 | 1 | 3 | 1 | 3 | 4 | 2 | 2 |
| 1-[p-chloro-β-(2,6-dichlorobenzyloxy)phenethyl]-2-ethylimidazole nitrate | | | | | 0 | 0 | 0 | 0 | 0 | 4 | 4 | 4 | 4 | 0 | 1 |
| 1-[p-chloro-β-(2,4-dichlorobenzyloxy)phenethyl]-2-ethylimidazole nitrate | | | | | 0 | 0 | 0 | 0 | 0 | 4 | 4 | 4 | 3 | 0 | 1 |
| 1-[p-chloro-β-(2,4-dichlorobenzyloxy)phenethyl]-2-methylimidazole nitrate | | | | | 0 | 0 | 0 | 0 | 0 | 4 | 3 | 2 | 0 | 0 | 0 |
| 1-[p-chloro-β-(2,6-dichlorobenzyloxy)phenethyl]-2-methylimidazole nitrate | | | | | 0 | 0 | 0 | 0 | 0 | 3 | 3 | 2 | 3 | 0 | 0 |
| 1-[β-chlorobenzyloxy)-A,A-dimethylphenethyl]-imidazole | | | | | 0 | 0 | 0 | 0 | 0 | 0 | 0 | 0 | 0 | 0 | 0 |

[1] For the meanings of 1, 2, 3 to 11, see the footnote of the table relating to the corresponding amine-derivatives.
[2] C$_4$H$_2$ClS=5-chloro-2-thienyl.

TABLE II-b.—ETHER-DERIVATIVES

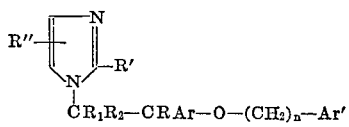

| Compound [1] | Fungistatic activity (final score at 100 μg./ml.) | | | | | | | | | | |
|---|---|---|---|---|---|---|---|---|---|---|---|
| | 1 | 2 | 3 | 4 | 5 | 6 | 7 | 8 | 9 | 10 | 11 |
| A | 0 | 0 | 0 | 1 | 0 | 3 | 0 | 4 | 2 | 0 | 0 |
| B | 2 | 0 | 0 | 1 | 0 | 4 | 4 | 0 | 3 | 1 | 1 |
| C | 0 | 0 | 0 | 3 | 0 | 3 | 0 | 4 | 3 | 0 | 3 |
| D | 0 | 0 | 0 | 0 | 0 | 0 | 0 | 4 | 0 | 0 | 0 |
| E | 0 | 0 | 0 | 4 | 1 | 4 | 2 | 4 | 3 | 2 | 2 |
| F | 1 | 0 | 1 | 2 | 1 | 4 | 2 | 4 | 3 | 0 | 2 |
| G | 1 | 0 | 0 | 0 | 0 | 4 | 1 | 4 | 0 | 0 | 0 |
| H | 0 | 0 | 0 | 1 | 1 | 4 | 4 | 4 | 0 | 0 | 0 |
| I | 0 | 0 | 0 | 3 | 3 | 4 | 3 | 4 | 4 | 0 | 3 |
| J | 0 | 0 | 0 | 0 | 1 | 2 | 2 | 1 | 0 | 0 | 0 |
| K | 0 | 0 | 0 | 1 | 0 | 3 | 1 | 2 | 1 | 0 | 2 |
| L | 1 | 0 | 0 | 2 | 1 | 4 | 2 | 2 | 3 | 0 | 1 |
| M | 0 | 0 | 0 | 3 | 3 | 4 | 4 | 3 | 1 | 2 | 3 |
| N | 0 | 0 | 0 | 0 | 0 | 3 | 0 | 1 | 0 | 0 | 0 |
| O | 0 | 0 | 0 | 1 | 0 | 4 | 0 | 2 | 0 | 0 | 0 |
| P | 0 | 0 | 0 | 1 | 1 | 3 | 0 | 1 | 0 | 0 | 0 |
| Q | 0 | 0 | 0 | 3 | 2 | 4 | 1 | 4 | 0 | 3 | 2 |
| R | 0 | 0 | 0 | 3 | 3 | 4 | 2 | 4 | 3 | 1 | 3 |
| S | 0 | 0 | 0 | 2 | 1 | 4 | 3 | 4 | 1 | 0 | 2 |
| T | 0 | 0 | 0 | 1 | 0 | 2 | 0 | 1 | 0 | 0 | 0 |
| U | 0 | 0 | 0 | 0 | 0 | 3 | 0 | 2 | 0 | 0 | 0 |
| V | 0 | 0 | 0 | 0 | 0 | 3 | 1 | 2 | 0 | 0 | 1 |
| W | 0 | 0 | 0 | 2 | 0 | 3 | 1 | 3 | 0 | 0 | 0 |
| X | 0 | 0 | 0 | 3 | 2 | 4 | 4 | 2 | 1 | 0 | 3 |
| Y | 0 | 0 | 0 | 3 | 2 | 4 | 4 | 4 | 3 | 1 | 4 |
| Z | 0 | 0 | 0 | 2 | 0 | 4 | 1 | 4 | 1 | 0 | 0 |
| AA | 0 | 0 | 0 | 1 | 2 | 4 | 2 | 4 | 0 | 0 | 1 |
| BB | 0 | 0 | 0 | 2 | 0 | 2 | 0 | 3 | 0 | 1 | 1 |
| CC | 0 | 0 | 0 | 1 | 0 | 2 | 0 | 3 | 0 | 0 | 3 |
| DD | 0 | 0 | 0 | 1 | 0 | 2 | 0 | 1 | 1 | 0 | 1 |

[1] See the following table:

| Compound | name |
|---|---|
| A | 1-[p-chloro-β-(2,4-dichlorobenzyloxy)phenethyl]-5-methylimidazole nitrate. |
| B | 1-[p-chloro-β-(2,4-dichlorobenzyloxy)phenethyl]-2,4-dimethylimidazole nitrate. |
| C | (+)-1-[2,4-dichloro-β-(2,4-dichlorobenzyloxy)phenethyl]imidazole nitrate. |
| D | (−)-1-[2,4-dichloro-β-(2,4-dichlorobenzyloxy)phenethyl]imidazole nitrate. |
| E | 1-[2,4,6-trichloro-β-(2,4-dichlorobenzyloxy)phenethyl]imidazole nitrate. |
| F | 1-[2,4,6-trichloro-β-(2,6-dichlorobenzyloxy)phenethyl]imidazole nitrate. |
| G | 1-[2,4-dichloro-β-(3,4-dimethylbenzyloxy)phenethyl]imidazole nitrate. |
| H | 1-[2,4-dichloro-β-(p-iodobenzyloxy)phenethyl]imidazole nitrate. |
| I | 1-[2,4-dichloro-β-(2-methoxy-4-nitrobenzyloxy)phenethyl]imidazole nitrate. |
| J | α-[1-(2,4-dichlorophenyl)-2-(1-imidazolyl)ethoxy]-p-tolunitrile nitrate. |
| K | 1-[3,4-dichloro-β-(2,4-dichlorobenzyloxy)phenethyl]imidazole nitrate. |
| L | 1-[3,4-dichloro-β-(2,6-dichlorobenzyloxy)phenethyl]imidazole nitrate. |
| M | 1-[3,4-dichloro-β-(3,4-dichlorobenzyloxy)phenethyl]imidazole nitrate. |
| N | 1-[2,4-dichloro-β-(3,4-dichlorobenzyloxy)phenethyl]imidazole nitrate. |
| O | 1-(o-chloro-β-(3,4-dichlorobenzyloxy)phenethyl]imidazole nitrate. |
| P | 1-[β-(3,4-dichlorobenzyloxy)-p-fluorophenethyl]imidazole nitrate. |
| Q | 1-[3,4-dichloro-β-(p-chlorobenzyloxy)phenethyl]imidazole nitrate. |
| R | 1-[2,6-dichloro-β-(2,4-dichlorobenzyloxy)phenethyl]imidazole nitrate. |
| S | 1-[2,6-dichloro-β-(2,6-dichlorobenzyloxy)phenethyl]imidazole nitrate. |
| T | 1-[2,6-dichloro-β-(p-chlorobenzyloxy)phenethyl]imidazole nitrate. |
| U | 1-[2,5-dichloro-β-(p-chlorobenzyloxy)phenethyl]imidazole nitrate. |
| V | 1-[2,5-dichloro-β-(2,6-dichlorobenzyloxy)phenethyl]imidazole nitrate. |
| W | 1-[2,5-dichloro-β-(2,4-dichlorobenzyloxy)phenethyl]imidazole nitrate. |
| X | 1-(2,5-dichloro-β-(2,5-dichlorobenzyloxy)phenethyl]imidazole nitrate. |
| Y | 1-[β-(p-tert-butylbenzyloxy)-2,4-dichlorophenethyl]imidazole nitrate. |
| Z | 1-[2,4-dichloro-β-(p-cumenylmethoxy)phenethyl]imidazole nitrate. |
| AA | 1-[2,6-dichloro-β-(p-methoxybenzyloxy)phenethyl]imidazole nitrate. |
| BB | 1-[p-chloro-β-(2,6-dichlorobenzyloxy)-α,α-dimethylphenethyl]imidazole nitrate. |
| CC | 1-[p-chloro-β-(p-fluorobenzyloxy)-α,α-dimethylphenethyl]imidazole nitrate. |
| DD | 1-[p-chloro-β-(2,4-dichlorobenzyloxy)-α,α-dimethylphenethyl]imidazole nitrate. |

TABLE III-a.—ETHER-DERIVATIVES

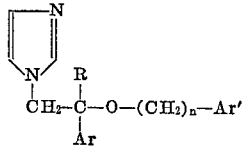

| Ar | R | n | Ar' | Base or salt | Bactericidal activity (final score at 10 μg./ml.) | | |
|---|---|---|---|---|---|---|---|
| | | | | | 1[1] | 2 | 3 |
| C$_6$H$_5$ | H | 1 | 4-Cl—C$_6$H$_4$ | HNO$_3$ | 0 | 0 | 0 |
| 4-Cl—C$_6$H$_4$ | H | 1 | 4-Cl—C$_6$H$_4$ | HNO$_3$ | 0 | 0 | 0 |
| 4-F—C$_6$H$_4$ | H | 1 | 4-Cl—C$_6$H$_4$ | HNO$_3$ | 0 | 0 | 0 |
| 2,4-Cl$_2$—C$_6$H$_3$ | H | 1 | 4-Cl—C$_6$H$_4$ | HNO$_3$ | 0 | 0 | 0 |
| 2-Cl—C$_6$H$_4$ | H | 1 | 4-Cl—C$_6$H$_4$ | HNO$_3$ | 0 | 0 | 0 |
| 2,4-Cl$_2$—C$_6$H$_3$ | H | 1 | 2,4-Cl$_2$—C$_6$H$_3$ | HNO$_3$ | 0 | 0 | — |
| 4-F—C$_6$H$_4$ | H | 1 | 2,4-Cl$_2$—C$_6$H$_3$ | HNO$_3$ | 0 | + | 0 |
| 4-CH$_3$—C$_6$H$_4$ | H | 1 | 2,4-Cl$_2$—C$_6$H$_3$ | HNO$_3$ | 0 | + | 0 |
| 2-CH$_3$—C$_6$H$_4$ | H | 1 | 2,4-Cl$_2$—C$_6$H$_3$ | HNO$_3$ | 0 | 0 | 0 |
| 4-CH$_3$—C$_6$H$_4$ | H | 1 | 4-Cl—C$_6$H$_4$ | HNO$_3$ | 0 | 0 | 0 |
| 2-Cl—C$_6$H$_4$ | H | 1 | 2,4-Cl$_2$—C$_6$H$_3$ | HNO$_3$ | 0 | 0 | 0 |
| 2-Cl—C$_6$H$_4$ | H | 1 | 2,4-Cl$_2$—C$_6$H$_3$ | HNO$_3$ | 0 | 0 | 0 |
| 4 Cl—C$_6$H$_4$ | H | 1 | 2-Cl—C$_6$H$_4$ | HNO$_3$ | 0 | 0 | 0 |
| 4-F—C$_6$H$_4$ | H | 1 | 4-Cl—C$_6$H$_4$ | HNO$_3$ | 0 | 0 | 0 |
| 4-Br—C$_6$H$_4$ | H | 1 | 4-Cl—C$_6$H$_4$ | HNO$_3$ | 0 | 0 | 0 |
| 2-OCH$_3$—C$_6$H$_4$ | H | 1 | 2,4-Cl$_2$—C$_6$H$_3$ | HNO$_3$ | 0 | 0 | 0 |
| 4-CH$_3$—C$_6$H$_4$ | H | 1 | 2-Cl—C$_6$H$_4$ | HNO$_3$ | 0 | 0 | 0 |
| 2-CH$_3$—C$_6$H$_4$ | H | 1 | 2-Cl—C$_6$H$_4$ | HNO$_3$ | 0 | 0 | 0 |
| 2-OCH$_3$—C$_6$H$_4$ | H | 1 | 2-Cl—C$_6$H$_4$ | HNO$_3$ | 0 | 0 | 0 |
| 2-Cl—C$_6$H$_4$ | H | 1 | 2-Cl—C$_6$H$_4$ | HNO$_3$ | 0 | 0 | 0 |
| 2,4-Cl$_2$—C$_6$H$_3$ | H | 1 | 2-Cl—C$_6$H$_4$ | HNO$_3$ | 0 | 0 | 0 |
| 4-Br—C$_6$H$_4$ | H | 1 | 2-Cl—C$_6$H$_4$ | HNO$_3$ | 0 | 0 | 0 |
| C$_6$H$_5$ | CH$_3$ | 1 | 4-Cl—C$_6$H$_4$ | HNO$_3$ | 0 | 0 | — |
| C$_6$H$_5$ | CH$_3$ | 1 | 2,4-Cl$_2$—C$_6$H$_3$ | HNO$_3$ | 0 | 0 | 0 |
| 4-Cl—C$_6$H$_4$ | CH$_3$ | 1 | 4-Cl—C$_6$H$_4$ | HNO$_3$ | 0 | 0 | — |
| 4-Cl—C$_6$H$_4$ | CH$_3$ | 1 | 2,4-Cl$_2$—C$_6$H$_3$ | HNO$_3$ | 0 | 0 | 0 |
| 5-Cl—C$_4$H$_2$S [2] | H | 1 | 2-Cl—C$_6$H$_4$ | HNO$_3$ | 0 | 0 | — |
| 2,4-Cl$_2$—C$_6$H$_3$ | H | 1 | 2-Cl—C$_6$H$_4$ | HNO$_3$ | 0 | 0 | 0 |
| 2,4-Cl$_2$—C$_6$H$_3$ | H | 1 | 2,6-Cl$_2$—C$_6$H$_3$ | HNO$_3$ | 0 | 0 | 0 |
| C$_6$H$_5$ | H | 1 | C$_6$H$_5$ | HNO$_3$ | 0 | + | 0 |
| 2,4-Cl$_2$—C$_6$H$_3$ | H | 1 | 3-OCH$_3$—C$_6$H$_4$ | HNO$_3$ | 0 | 0 | 0 |
| 4-Cl—C$_6$H$_4$ | H | 1 | 2-CH$_3$—C$_6$H$_4$ | HNO$_3$ | 0 | 0 | 0 |

TABLE III-a.—ETHER-DERIVATIVES—Continued

| Ar | R | n | Ar' | Base or salt | Bactericidal activity (final score at 10 μg./ml.) | | |
|---|---|---|---|---|---|---|---|
| | | | | | 1[1] | 2 | 3 |
| 4-Cl—C₆H₄ | H | 1 | 2,6-Cl₂—C₆H₃ | HNO₃ | 0 | 0 | 0 |
| 2,4-Cl₂—C₆H₃ | H | 0 | 4-NO₂—C₆H₄ | HNO₃ | 0 | 0 | 0 |
| 2,4-Cl₂—C₆H₃ | H | 1 | 4-OCH₃—C₆H₄ | HNO₃ | 0 | 0 | 0 |
| 4-Cl—C₆H₄ | H | 1 | 4-CH₃—C₆H₄ | HCl.H₂O | 0 | 0 | 0 |
| 2,4-Cl₂—C₆H₃ | H | 1 | 2-F—C₆H₄ | HNO₃ | 0 | 0 | 0 |
| 2,4-Cl₂—C₆H₃ | H | 1 | 4-F—C₆H₄ | HNO₃ | 0 | 0 | 0 |
| 2,4-Cl₂—C₆H₃ | H | 1 | 2,4-(NO₂)₂—C₆H₃ | HNO₃ | 0 | + | 0 |
| 2,4-Cl₂—C₆H₃ | H | 0 | 4-NH₂—C₆H₄ | Base | 0 | + | 0 |

[1] 1. *Erysipelothrix insidiosa;* 2. *Staphylococcus hemolyticus;* 3. *Streptococcus pyogenes.*
[2] Thienyl.

Note.—0 = no growth; — = test not performed.

TABLE III-b.—ETHER-DERIVATIVES $$R''-\underset{N}{\overset{N}{\bigcirc}}-R'$$

CR₁R₂—CRAr—O—(CH₂)ₙ—Ar'

| Compound[1] | Bactericidal activity (final score at 10 μg./ml.) | | |
|---|---|---|---|
| | 1 | 2 | 3 |
| A | 0 | 0 | 0 |
| B | 0 | + | 0 |
| C | 0 | 0 | 0 |
| D | 0 | 0 | 0 |
| E | 0 | 0 | 0 |
| F | 0 | 0 | 0 |
| G | 0 | 0 | 0 |
| H | 0 | + | 0 |
| I | 0 | + | 0 |
| J | 0 | + | + |
| K | — | — | — |
| L | 0 | 0 | 0 |
| M | + | + | 0 |
| N | 0 | 0 | 0 |
| O | 0 | 0 | 0 |
| P | 0 | 0 | 0 |
| Q | 0 | + | 0 |
| S | 0 | + | 0 |
| U | 0 | 0 | 0 |
| V | 0 | 0 | 0 |
| W | 0 | 0 | 0 |
| X | 0 | + | + |
| Y | 0 | 0 | 0 |
| Z | 0 | 0 | 0 |
| AA | 0 | + | 0 |
| BB | 0 | 0 | 0 |
| DD | 0 | + | 0 |

[1] For compound name, see Table II-b.

In view of the aforementioned anti-fungal and antibacterial activities, this invention provides valuable compositions comprising the subject amines and ethers (I) or the acid addition salts thereof as the active ingredient in a solvent or a solid, semi-solid or liquid diluent or carrier, and, in addition, it provides an effectve method of combatting fungus or bacterial growth by use of an effective anti-fungal or anti-bacterial amount of such amines and ethers (I) or salts thereof. The subject compounds can be used in suitable solvents or diluents, in the form of emulsions, suspensions, dispersions or ointment, on suitable solid or semi-solid carrier substances, in ordinary or synthetic soaps, detergents or dispersion media, if desired, together with other compounds having arachnicidal, insecticidal, ovicidal, fungicidal and/or bactericidal effects, or together with inactive additives.

Sold carrier substances which are suitable for the preparation of compositions in powder form include various inert, porous and pulverous distributing agents of inorganic or organic nature, such as, for example, tricalcium phosphate, calcium carbonate, in the form of prepared chalk or ground limestone, kaolin, bole, bentonite, talcum, kieselghur and boric acid; powdered cork, sawdust, and other fine pulverous materials of vegetable origin are also suitable carrier substances.

The active ingredient is mixed with these carrier substances, for example, by being ground therewith; alternatively, the inert carrier substance is impregnated with a solution of the active component in a readily volatile solvent and the solvent is thereafter eliminated by heating or by filtering with suction at reduced pressure. By adding wetting and/or dispersing agents, such as pulverous preparations can also be made readily wettable with water, so that suspensions are obtained.

Inert solvents used for the production of liquid preparations should preferably not be readily inflammable and should be as far as possible odorless and as far as possible non-toxic to warm-blooded animals or plants in the relevant surroundings. Solvents suitable for this purpose are high-boiling oils, for example, of vegetable origin, and lower-boiling solvents with a flash point of at least 30° C., such as, for example, isopropanol, dimethylsulfoxide, hydrogenated naphthalenes and alkylated napthalenes. It is, of course, also possible to use mixtures of solvents. Solutions can be prepared in the usual way, if necessary, with assistance of solution promoters. Other liquid forms which can be used consist of emulsions or suspensions of the active compound in water or suitable inert solvents, or also concentrates for preparing such emulsions, which can be directly adjusted to the required concentration. For this purpose, the active ingredient is, for example, mixed with a dispersing or emulsifying agent. The active component can also be dissolved or dispersed in a suitable inert solvent and mixed simultaneously or subsequently with a dispersing or emulsifying agent.

It is also possible to use semi-solid carrier substances of a cream ointment, paste or waxlike nature, into which the active component can be incorporated, if necessary, with the aid of solution promoters and/or emulsifiers. Vaseline and other cream bases are examples of semi-solid carrier substances.

Furthermore, it is possible for the active component to be used in the form of aerosols. For this purpose, the active component is dissolved or dispersed, if necessary, with the aid of suitable inert solvents as carrier liquids, such as difluorodichloromethane, which at atmospheric pressure boils at a temperature lower than room temperature, or in other volatile solvents. In this way, solutions under pressure are obtained which, when sprayed, yield aerosols which are particularly suitable for controlling or combatting fungi and bacteria, e.g., in closed chambers and storage rooms, and for application to vegetation for eradicating or for preventing infections by fungi or bacteria.

The subject compounds and compositions thereof can be applied by conventional methods. For example, a fungus or bacterial growth or a material to be treated or to be protected against attack by fungus or bacterium can be treated with the subject compounds and the compositions thereof by dusting, sprinkling, spraying, brushing, dipping, smearing, impregnating or other suitable means.

When the subject compounds are employed in combination with suitable carriers, e.g., in solution, suspension, dust, powder, ointment, emulsion, and the like forms, a high activity over a very high range of dilution is observed. For example, concentrations of the active ingredient ranging from 0.1–10 percent by weight, based on the weight of composition employed, have been found effective in combatting fungi or bacteria. Of course, higher concentrations may also be employed as warranted by the particular situation.

The following examples are intended to illustrate, but not to limit, the scope of the present invention. Unless otherwise stated, all parts are by weight.

EXAMPLE I

A mixture of 11 parts of N-acetyl-imidazole and 19 parts of phenacylbromide in 40 parts of acetonitrile is stirred and refluxed for 2 hours. The solvent is evaporated in vacuo. The residue is taken up in hot water and the solution cooled and filtered. To the aqueous filtrate is added a solution of sodium carbonate in water till pH 9: the product is precipitated immediately. It is filtered off and recrystallized twice: first from hot water and then from a mixture of diisopropylether and 2-propanol, yielding 1-(benzoyl-methyl)-imidazole; M.P. 114–117° C.

EXAMPLE II (A) To a stirred and refluxing solution of 8.3 parts of 1-acetyl-imidazole in 40 parts of acetonitrile is added portionwise 10.4 parts of 4-methyl-phenacylbromide. After the addition is complete, the whole is stirred and refluxed for 2 hours longer. The solvent is evaporated in vacuo and the residue dissolved in water. This aqueous phase is extracted with ether and then there is added to the aqueous phase sodium carbonate solution till pH 9. An oil is separated, which solidifies on scratching. The solid is filtered off and recrystallized from hot water (activated charcoal is added). The product is filtered off again, after cooling, and dried, yielding 1-[(4-methyl-benzoyl)-methyl]-imidazole; M.P. 133–134° C.

(B) Six parts of the ketone base are dissolved in 12 parts of warm acetone. To this warm solution is added 2-propanol previously saturated with hydrochloric acid and the salt is allowed to crystallize. The precipitated solid salt is filtered off and recrystallized from a mixture of 2-propanol and acetone, yielding 1-(4-methyl-benzoyl-methyl)-imidazole hydrochloride; M.P. 210.5–216° C.

EXAMPLE III

To a stirred and refluxing solution of 12.1 parts of 1-acetyl-imidazole in 40 parts of acetonitrile is added dropwise a solution of 23.3 parts of 4-chloro-phenacylbromide in 40 parts of acetonitrile over the course of 30 minutes. After addition is complete, the reaction mixture is stirred and refluxed for 2 hours. The solvent is evaporated in vacuo and the residue dissolved in water. To this solution is added a solution of sodium carbonate in water until pH 9, whereupon the solid free base, 1-(4-chloro-benzoyl-methyl)-imidazole, is precipitated. It is filtered off and dissolved in acetone. To this solution is added 2-propanol previously saturated with gaseous hydrogen chloride. The salt is precipitated and recrystallized from a mixture of 2-propanol and acetone, yielding 1-(4-chloro-benzoyl-methyl)-imidazole hydrochloride; M.P. 228–229° C.

EXAMPLE IV

To a solution of 20.4 parts of imidazole in 40 parts of methanol are added 23.3 parts of o-chlorophenacylbromide and the whole is stirred for 2 hours at 0° C. The solvent is evaporated in vacuo and the residue is poured onto water. The product, 2′-chloro-2-(2-imidazolyl)acetophenone, is extracted with chloroform. The extract is washed with water, dried, filtered and evaporated. From the residual free base, the hydrochloride salt is prepared in the usual manner, yielding, after two recrystallizations: first from a mixture of 2-propanol and diisopropylether and then from a mixture of methanol and diisopropylether, 2′-chloro-2-(1-imidazolyl)acetophenone hydrochloride; M.P. 186.5–189° C.

EXAMPLE V

To a solution of 276 parts of p-fluoro-acetophenone in 400 parts of dioxane and 640 parts of dry ether are added dropwise 320 parts of bromine, while cooling on ice and stirring. The mixture is then brought to room temperature and the solvent is removed in vacuo, till an internal temperature of 110° C. is obtained. The residue is cooled on an ice-salt bath and there are added 640 parts of acetone. At a temperature of 0° C., there is added a solution of 528 parts of imidazole in 640 parts of methanol, while stirring. The whole is further stirred for 3 hours while cooling. The solvent is removed at atmospheric pressure till 125° C. internal temperature. To the residue are added, after cooling 750 parts of chloroform and 500 parts of water. The chloroform layer is separated, stirred for 30 minutes, washed with water, dried, filtered and evaporated. From the residue containing 1-(p-fluorophenacyl)-imidazole, the hydrochloride salt is prepared in the usual manner. The crude salt is recrystallized twice from a mixture of 2-propanol, methanol and diisopropylether. The free base is again liberated by treatment with an equivalent amount of sodium hydroxide and after recrystallization from a mixture of 2-propanol and diisopropylether, about 178 parts of 1-(p-fluorophenacyl) imidazole are obtained; M.P. 149–155° C.

EXAMPLE VI

To a solution of 268 parts of o-methylacetophenone in 400 parts of dioxane and 640 parts of dry ether are added dropwise 320 parts of bromine, while cooling on ice and stirring. The solvent is removed at atmospheric pressure, while stirring, until an internal temperature of 125–140° C. is reached. The whole is further stirred and cooled in an ice-salt bath and there are added successively 240 parts of methanol, followed by a solution of 544 parts of imidazole in 640 parts of methanol. After stirring for 3 hours at 0° C., the solvent is removed at atmospheric pressure until an internal temperature of 125° C. The whole is cooled again on ice and there is added successively 1200 parts of methylenechloride and 2000 parts of water. The organic layer is separated, washed with water, dried, filtered and evaporated in vacuo. The residue, containing 2-(1-imidazolyl)-2′-methylacetophenone, is taken up in chloroform and treated with an excess of concentrated nitric acid yielding, after recrystallization of the crude salt from methanol, 2 - (1-imidazolyl)-2′-methylacetophenone nitrate; M.P. 165.5–167° C. The free base is obtained by treating the nitrate salt with an equivalent quantity of sodium hydroxide.

EXAMPLE VII

To a solution of 252 parts of bromine in 400 parts of dry ether and 640 parts of dioxane is added dropwise 320 parts of methyl-2-thienylketone, while cooling on ice and stirring. The solvent is removed at atmospheric pressure until an internal temperature of 125° C. is reached. The residue is cooled on an ice-salt bath and 400 parts of acetonitrile are added while stirring. At an internal temperature of 0° C., there is added a hot solution of 544 parts of imidazole in 400 parts of acetonitrile: the temperature rises to 60° C. and over 30 minutes the temperature is brought to 0–5° C. The whole is further stirred first for 1½ hrs. while cooling and then at reflux temperature for one hour. The solvent is removed at atmospheric pressure until internal temperature of 125° C. The residue is cooled on ice and there are added successively 800 parts of methylene dichloride and 1500 parts of water. The methylene dichloride solution is washed three times with water, dried, filtered and evaporated in vacuo. From the residual oily free base, the nitrate salt is prepared in the usual manner. The solid salt is filtered off and recrystallized twice: first from acetonitrile (charcoal) and then from a mixture of ethanol and diisopropylether, yielding (1-imidazolylmethyl)-2-thienylketone nitrate; M.P. 136° C.

EXAMPLE VIII

A solution of 50 parts of 2′,4′-dichloroacetophenone in 400 parts of refluxing methanol is brominated with 41.5 parts of bromine, while stirring. After the addition is complete, the mixture is cooled in an ice-bath and there are added 90 parts of imidazole with stirring. Stirring is then continued for another 3 hours. The solvent is removed in vacuo. The residue is poured onto water and the product 2′,4′-dichloro-2-(1-imidazolyl)-acetophenone, is extracted with methylene chloride. The extract is washed with water, dried, filtered and evaporated in vacuo. From the residual oily free base, the nitrate salt is prepared in the usual manner. The precipitated solid salt is filtered off and recrystallized from water, yielding 2',4'-dichloro-2-(1-imidazolyl)acetophenone nitrate; M.P. 164.5° C.

EXAMPLE IX

To a stirred mixture of 150 parts of 2'-methoxyacetophenone in 320 parts of ether and 160 parts of dioxane are added dropwise 160 parts of bromine. After the addition is complete, stirring is continued for 2 hours. The mixture is cooled on ice and there is added 350 parts of imidazole in 400 parts of methanol and the whole is stirred overnight. The solvents are evaporated till an internal temperature of 90° C. is reached. Then 1000 parts of water are added to the residue and the product, 2-(1-imidazolyl)-2'-methoxyacetophenone, is extracted with chloroform. The extract is washed with water and there is added an excess of 2-propanol previously saturated with gaseous hydrogen chloride. The precipitated salt is filtered off and recrystallized from a mixture of ethanol 95%, acetone and diisopropylether, yielding 2-(1-imidazolyl)-2'-methoxy-acetophenone hydrochloride; M.P. 208° C.

EXAMPLE X

To a stirred mixture of 328 parts of 2-methylpropiophenone in 640 parts of ether and 320 parts of dioxane are added dropwise 320 parts of bromine over a period of 2 hours. The mixture is cooled on ice and there is added successively 700 parts of imidazole in 400 parts of methanol and 640 parts of acetonitrile. The whole is stirred for 2 hours. The solvents are evaporated off until an internal temperature of 80° C. is reached. Stirring and refluxing is continued for one hour and the solvents are further evaporated off till a temperature of 100° C. is reached. The residue is cooled and there is added 3000 parts of water and 400 parts of diisopropylether. On triturating, the product is precipitated. The free base, 2-(1-imidazolyl)-2-methylpropiophenone is converted into its nitrate salt in the conventional manner. The crude salt is filtered off and recrystallized from a mixture of ethanol 95%, acetone and diisopropylether, yielding 2-(1-imidazolyl)-2-methylpropiophenone, nitrate; M.P. 167.5° C.

EXAMPLE XI

To a stirred mixture of 199 parts of 4'-bromoacetophenone in 320 parts of ether and 160 parts of dioxane are added dropwise 160 parts of bromine. After the addition is complete, the whole is stirred for one hour. The mixture is cooled on ice and there are added 350 parts of bromine in 400 parts of methanol. After stirring overnight, the solvents are evaporated off till an internal temperature of 90° C. is reached. Then 1000 parts of water are added and the crude solid product is filtered off. The latter is taken up in 1000 parts of hot chloroform and on the addition of water, some by-product is precipitated and filtered off. The chloroform phase is separated, washed with water and an excess of concentrated nitric acid solution is added. The resulting 4'-bromo-2-(1-imidazolyl) acetophenone nitrate is triturated in 320 parts of dimethylformamide, basified with ammonium hydroxide solution and, on the addition of water, the free base, 4'-bromo-2-(1-imidazolyl)acetophenone, is precipitated. It is filtered off and recrystallized from toluene, M.P. 164° C.

EXAMPLE XII

To a cooled (5°–15° C.) slurry of 120 parts imidazole in 125 parts of dimethylformamide is added portionwise 82 parts of 2-(5-chloro-2-thienyl)acetylbromide in 125 parts of dimethylformamide. After the addition is complete, the whole is stirred on ice for 2 hours. The reaction mixture is poured onto water, whereupon the product, (5-chloro-2-thienyl)-(1 - imidazolylmethyl) - ketone, is precipitated. It is filtered off and taken up in 750 parts of chloroform, washed with water and the chloroform evaporated. The residue is triturated in ether and filtered off again, yielding the free base, M.P. 104–106° C. From this fraction, 4.4 parts are converted into the nitrate salt, yielding, after recrystallization of the crude solid salt from ethanol, 3.7 parts of (5-chloro-2-thienyl)-(1-imidazolylmethyl)ketone nitrate; M.P. 161.5° C.

EXAMPLE XIII

To a suspension of 40 parts of 1-(p-chlorobenzoylmethyl)imidazole in 120 parts of methanol are added portionwise 4 parts of sodium borohydride while cooling on ice and while stirring. After 30 minutes, the reaction mixture is stirred and refluxed for one hour and 100 parts of water are added. The methanol is removed at atmospheric pressure. Then there are added 16 parts of concentrated hydrochloric acid solution and the whole is stirred and refluxed for 5 minutes. After cooling on ice-bath, an excess of ammonium hydroxide solution is added, whereupon the alcohol product is precipitated. It is filtered off, washed with water and recrystallized from a mixture of dimethylformamide and water, yielding α-(p-chlorophenyl)imidazole-1-ethanol; M.P. 180° C.

EXAMPLE XIV

The procedure of Example XIII is repeated except that an equivalent amount of an appropriate starting ketone is substituted therein to yield, as respective products, the following alcohols of Formula V, some of which have been converted to the indicated acid addition salt by treatment in the conventional manner with the appropriate acid:

α-(o-chlorophenyl)imidazole-1-ethanol nitrate, M.P. 143° C.;
α-(p-fluorophenyl)imidazole-1-ethanol, M.P. 146.5° C.;
α-(2,4-dichlorophenyl)imidazole-1-ethanol, M.P. 136.5° C.;
α-(o-tolyl)imidazole-1-ethanol nitrate, M.P. 131° C.; and
α-(p-tolyl)imidazole-1-ethanol, M.P. 155° C.

EXAMPLE XV

To a stirred and cooled (5° C.) mixture of 14 parts of 2-(1-imidazolyl)-2-methylpropiophenone in 80 parts of methanol are added portionwise 1.3 parts of sodium borohydride. The whole is first stirred for one hour at 5° C. and further for one hour at reflux temperature. Then 60 pats of the solvent are evaporated off. To the residue are added 300 parts of water and then dilute hydrochloric acid solution till pH 2. The whole is briefly refluxed for about 5 minutes, and, after being made basic with sodium hydroxide solution and cooled, the alcohol product is precipitated. It is filtered off and recrystallized twice: first from a mixture of toluene and petroleum ether and then from acetone, yielding β,β-dimethyl-α-phenylimidazole-1-ethanol; M.P. 139° C.

EXAMPLE XVI

By repeating the procedure of Example XV, except that an equivalent quantity of an appropriate starting ketone is substituted therein, the following alcohols of Formula V are obtained, either in base form or as the indicated acid addition salt by treatment in the conventional manner with an appropriate acid:

α-(phenyl)imidazole-1-ethanol;
α-(p-bromophenyl)imidazole-1-ethanol, M.P. 188.5° C.;
α-(o-methyoxyphenyl)imidazole-1-ethanol hydrochloride, M.P. 171.5° C.;
α-(2-thienyl)imidazole-1-ethanol; and
α-(5-chloro-2-thienyl)imidazole-1-ethanol, M.P. 131.5° C.

EXAMPLE XVII

To a sodium methoxide solution, prepared from 9.2 parts of sodium in 140 parts of methanol, are added successively 27.2 parts of imidazole and 100 parts of dimethylformamide. The solvent is removed at atmospheric pressure while stirring. At an internal temperature of 130° C. (all of the methanol has been removed), there are added 47 parts of α-chloromethyl-α-methylbenzyl alcohol. The whole is stirred at 130° C. for one hour. After the addition of 50 parts of water, the alcohol product is crystallized. It is filtered off and recrystallized from toluene, yielding α-methyl-α-phenylimidazole-1-ethanol; M.P. 119.5° C.

EXAMPLE XVIII

To a sodium methoxide solution, prepared from 20.7 parts of sodium in 200 parts of methanol, are added successively 61.2 parts of imidazole and 200 parts of dimethylformamide. The solvent is removed at atmospheric pressure, while stirring. At an internal temperature of 130° C. (all of the methanol has been removed), there are added 133 parts of α-chloromethyl-α-methyl-(p-chlorobenzyl) alcohol. The whole is stirred for 5 minutes longer at a temperature of 135°–140° C. After the addition of 500 parts of water, the product is crystallized. The whole is cooled on ice and the product is filtered off. It is dissolved in chloroform. The solution is washed with water, dried, filtered and evaporated in vacuo. Tre residue is crystallized from a mixture of 4-methyl-2-pentanone and recrystallized once more from toluene, yielding α-(p-chlorophenyl)-α-methylimidazole-1-ethanol; M.P. 140° C.

EXAMPLE XIX

A solution of 18.6 parts of 1-(benzoylmethyl)-imidazole and 14.5 parts of β-phenethylamine in 160 parts of dry benzene containing a little amount of p-toluenesulphonic acid is stirred and refluxed in an apparatus equipped with a water trap. After 24 hours the theoretical amount of water is evolved. The solvent is removed in vacuo. The residue is dissolved in 120 parts of ethanol and this solution is hydrogenated at an initial pressure of 4.5 kg./cm.² at room temperature in the presence of 3 parts of palladium-on-charcoal catalyst 5%. After the calculated amount of hydrogen is taken up, hydrogenation is stopped. The solution is filtered and the solvent is removed in vacuo. The residue is dissolved in acetone and to this solution is added an excess of nitric acid solution (conc.) in diisopropylether: the nitrate salt separates out as an oil. The solvent is decanted and to the residue is added a new volume of acetone together with a little amount of diisopropylether whereupon the solid salt crystallizes out. It is filtered off, washed with acetone and recrystallized from a mixture of methanol, acetone and diisopropylether, yielding 1-(β-phenethylamino-phenethyl)-imidazole dinitrate; M.P. 164.5–168° C.

EXAMPLE XX

A solution of 18.1 parts of 1-(benzoyl-methyl)-imidazole and 11.2 parts of aniline in 80 parts of benzene containing a little amount of p-toluenesulphonic acid is stirred and refluxed in an apparatus equipped with a water-trap until the theoretical amount of water is evolved. The solvent is evaporated in vacuo and the residue is dissolved in 120 parts of ethanol. This solution is hydrogenated at an initial pressure of 4.2 kg./cm.² at room temperature in the presence of 3 parts of palladium-on-charcoal catalyst 5%. After 8 hours, the theoretical amount of hydrogen is taken up. The solution is filtered over hyflo and the solvent is removed in vacuo. The residue is dissolved in acetone and to this solution is added an excess of 2-propanol previously saturated with gaseous hydrogen chloride and diisopropylether is added. On cooling on ice, the hydrochloride product is precipitated. It is filtered off and recrystallized from a mixture of methanol, 2-propanol (previously saturated with gaseous hydrogen chloride), water and acetone, yielding 1-(β-anilinophenethyl)-imidazole dihydrochloride; M.P. 217.5–230° C. (dec.).

EXAMPLE XXI

A solution of 18.6 parts of 1-(benzoyl-methyl)-imidazole and 17.7 parts of 1-tetralinylamine in 160 parts of benzene containing a little amount of p-toluenesulfonic acid is stirred and refluxed in an apparatus equipped with a water-trap. After 24 hours, the theoretical amount of water is evolved. The solvent is evaporated in vacuo. The residue is dissolved in 120 parts of ethanol. This solution is hydrogenated at an initial pressure of 4.3 kg./cm.² at room temperature in the presence of 3 parts of palladium-on-charcoal catalyst 5%. After 8 hours, the theoretical amount of hydrogen is taken up. The solution is filtered over hyflo and the filtrate is evaporated in vacuo. The residue is dissolved in 80 parts of acetone. To this solution is added an excess of concentrated nitric acid solution in 2-propanol: the nitrate salt, which separates as an oil, solidifies on standing in ice. The solid product is filtered off and triturated in acetone (on ice). After 30 minutes, the product is filtered off again and recrystallized from a mixture of ethanol and diisopropylether, yielding 1-[β-(1-tetralinylamino) - phenethyl] - imidazole dinitrate; M.P. 139–143° C.

EXAMPLE XXII

A solution of 18.6 parts of 1-(benzoyl-methyl)-imidazole and 12.9 parts of benzylamine in 80 parts of benzene containing a little amount (about 0.5 part) of p-toluenesulphonic acid is stirred and refluxed for 4 hours. (The reaction vessel is provided with a reflux-condensor and water-separator). The solvent is removed in vacuo and the residue is dissolved in 120 parts of ethanol. At room temperature a first portion of 3.8 parts of sodium borohydride is added and the whole is stirred and refluxed for 30 minutes. Then a second portion of 3.8 parts of sodium borohydride is added and again stirred and refluxed for one hour. The solvent is removed in vacuo. To the residue is added successively 100 parts of water and 70 parts of a concentrated hydrochloric acid solution (pH: 2–3). This solution is stirred and refluxed for one hour. After cooling on ice, it is filtered and the filtrate is alkalized (strongly) with 10 N sodium hydroxide solution and the free base is extracted with methylene chloride. The extract is washed with water, dried, filtered and evaporated in vacuo. The residual free base is dissolved in acetone and to this solution is added an excess of 2-propanol previously saturated with gaseous hydrogen chloride. On further addition of diisopropylether, the hydrochloride salt is precipitated. It is filtered off and recrystallized twice: first from a mixture of methanol and diisopropylether and then from a mixture of ethanol and diisopropylether, yielding 1-(β-benzylamino-phenethyl)-imidazole dihydrochloride; M.P. 263.5–266.5° C.

EXAMPLE XXIII

A solution of 21.2 parts of p-chloro-benzylamine in 100 parts of toluene with 0.5 part of p-toluenesulfonic acid is prepared. To four-fifths of this solution are added 18.6 parts of 1-(benzoyl-methyl)-imidazole. The mixture is stirred and refluxed in an apparatus equipped with a watertrap. After 2 hours the theoretical amount of water is evolved and the remaining one-fifth portion of the solution of p-chloro-benzylamine in toluene is added. The reaction mixture is further stirred at reflux temperature for one hour. The solvent is evaporated. The residue is stirred three times in petroleum ether (total volume 80 parts) to remove the excess of p-chloro-benzylamine. The residue is then dissolved in 120 parts of ethanol and to the solution are added, portionwise, at 60° C., 4 parts of sodium borohydride. After the addition is complete, the whole is stirred at reflux temperature for 30 minutes. Then a second portion of 2 parts of sodium borohydride is added and the whole is stirred and refluxed for one hour. The solvent is evaporated in vacuo and to the residue are added 100 parts of water. This aqueous solution is acidified with concentrated hydrochloric acid solution to a pH 2–3 and the whole is stirred at reflux for 15 minutes. The mixture is cooled over ice, whereupon a solid is precipitated which is filtered off and to the filtrate is added an excess of sodium hydroxide solution 5 N. The product, 1 - [β-(p-chlorobenzylamino)-phenethyl]-imidazole, is extracted with benzene. The extract is washed with water, dried and evaporated in vacuo. From the residue, the hydrochloride salt is prepared in the usual manner, yielding, after recrystallization from a mixture of methanol and diisopropylether, 1-[β-(p-chlorobenzylamino) - phenethyl] - imidazole dihydrochloride; M.P. 264.5–266.5° C.

EXAMPLE XXIV

A mixture of 18.6 parts of 1-(benzyl-methyl)-imidazole and 15 parts of β-phenethylamine in 100 parts of toluene containing a little amount (about 0.5 part) of p-toluenesulfonic acid is stirred and refluxed in an apparatus equipped with a water-trap. After 3 hours, no more water is evolved. The solvent is evaporated and the residue is dissolved in 120 parts of ethanol. To this solution are added portionwise 4 parts of sodium borohydride. The whole is stirred first for 30 minutes at room temperature and then for 30 minutes at reflux temperature. Then another 2 parts of sodium borohydride are added and the mixture is stirred for 30 minutes longer at reflux temperature. The solvent is evaporated and to the residue are added 150 parts of water. The mixture is stirred and acidified with hydrochloric acid solution. The whole is heated to reflux point, cooled on ice and filtered from some insoluble material. The aqueous filtrate is made strongly alkaline with 5 N sodium hydroxide solution and the amine product is extracted three times with dry benzene. The combined extracts are dried and evaporated. From the residual oily free base, the hydrochloride salt is prepared in the usual manner. The crude salt is filtered off and recrystallized twice: first from a mixture of ethanol, acetone and diisopropylether and then from a mixture of ethanol and acetone, yielding 1-(β-phenethylaminophenethyl)-imidazole dihydrochloride; M.P. 167–171° C.

EXAMPLE XXV

The procedure of Example XXIV is repeated except that an equivalent quantity of m-chloro-benzylamine is used in place of the starting amine used therein to yield, as the respective product, 1-[β-(m-chlorobenzylamino)-phenethyl]-imidazole dihydrochloride; M.P. 251–255° C.

EXAMPLE XXVI

A solution of 18.6 parts of 1-(benzoyl-methyl)-imidazole, 17.8 parts of o-chlorobenzylamine, 0.5 part of p-toluenesulfonic acid and 120 parts of toluene is stirred and refluxed in an apparatus equipped with a watertrap After 3 hours, the theoretical amount of water is evolved. The solvent is evaporated in vacuo and the residue is dissolved in 120 parts of methanol. To this solution are added portionwise 4 parts of sodium borohydride (exothermic reaction: reflux temperature is reached). After the addition is complete, stirring and refluxing is continued for 1½ hours. The solvent is evaporated in vacuo and to the residue are added 100 parts of water. This aqueous solution is cooled on ice for one hour, filtered and the filtrate is made strongly alkaline with sodium hydroxide solution. The resulting solid product 1-[β-(o-chlorobenzylamino)phenethyl]imidazole, is extracted with benzene. The extract is washed with water, dried, filtered and evaporated in vacuo. The residue is washed with petroleum ether and after cooling on ice, the solvent is decanted. From the free base, the hydrochloride salt is prepared in the usual manner. The crude salt is filtered off and recrystallized twice: first from a mixture of ethanol and acetone and then from a mixture of acetone and water, yielding 1 - [β-(o-chlorobenzylamino)phenethyl] imidazole dihydrochloride; M.P. 239.5–251.5° C.

EXAMPLE XXVII

A solution of 20 parts of 1-(4-methyl-benzoyl-methyl)-imidazole, 19 parts of p-chloro-benzylamine, 0.5 part of p-toluenesulfonic acid in 120 parts of toluene is stirred and refluxed in an apparatus equipped with a watertrap. After 3 hours the theoretical amount of water is evolved. The solvent is removed in vacuo. The residue is dissolved in 120 parts of methanol. This solution is cooled on ice for 30 minutes and while stirring there are added portionwise 4 parts of sodium borohydride. The whole is further stirred while cooling for another 30 minutes. The cooling-bath is removed and the solution is stirred at reflux temperature for 30 minutes. The solvent is removed in vacuo. To the residue are added successively 100 parts of water and 50 parts of concentrated hydrochloric acid solution, while stirring. The whole is stirred and refluxed for 5 minutes and further cooled on ice for one hour. The mixture is filtered and the filtrate is made strongly alkaline with 15 N sodium hydroxide solution. The product, 1-[β-(p - chlorobenzylamino)-p-methylphenethyl]imidazole, is extracted with benzene. The extract is washed with water, dried, filtered and evaporated in vacuo. The residue is washed with pretroleum ether and cooled on ice. The solvent is decanted and from the residue the hydrochloride salt is prepared in the usual manner, yielding after recrystallization from a mixture of ethanol and diisopropylether, 1-[β-(p-chlorobenzylamino) - p - methylphenethyl]imidazole, dihydrochloride; M.P. 264–265° C.

EXAMPLE XXVIII

The reductive amination procedure of Example XXVII is repeated except that an equivalent quantity of an appropriate ketone of Formula II and an equivalent quantity of an appropriate amine of Formula III are substituted therein as starting materials to yield, as respective products, the following imidazole amines of Formula I-a in acid addition salt form by conventional treatment with the particular acid indicated below:

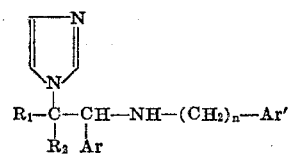

| Amine[1] | $R_1$ | $R_2$ | Ar | $n$ | Ar' | Salt | M.P. (° C.) |
|---|---|---|---|---|---|---|---|
| 1 | H | H | p-Cl—Ph | 1 | p-MeO—Ph | 2 HCl | 232–250 |
| 2 | H | H | p-Me—Ph | 1 | p-MeO—Ph | 2 HCl | 246–248 |
| 3 | H | H | p-Me—Ph | 2 | Ph | 2 HNO₃ | 148–154 |
| 4 | H | H | p-Cl—Ph | 1 | Ph | 2 HCl | 213–215 |
| 5 | H | H | p-Cl—Ph | 0 | Ph | 2 HCl | 201–221 |

TABLE—Continued

| Amine[1] | R₁ | R₂ | Ar | n | Ar' | Salt | M.P. (° C.) |
|---|---|---|---|---|---|---|---|
| 6 | H | H | p-Cl—Ph | 1 | p-Cl—Ph | 2 HCl | 224–227 |
| 7 | H | H | p-Cl—Ph | 1 | o-Cl—Ph | 2 HNO₃ | 194–197.5 |
| 8 | H | H | p-Cl—Ph | 2 | Ph | 2 HNO₃ | 145.5–148 |
| 9 | H | H | Ph | 1 | p-Me—Ph | 2 HCl | 260–261 |
| 10 | H | H | Ph | 1 | p-MeO—Ph | 2 HCl | 258–259 |
| 11 | H | H | p-Cl—Ph | 1 | p-Me—Ph | 2 HCl | 279–288 |
| 12 | H | H | p-Cl—Ph | 0 | 1-tetralinyl | 2 HCl.3 H₂O | 193–196 |
| 13 | H | H | p-F—Ph | 1 | Ph | 2 HNO₃ | 210–212 |
| 14 | H | H | p-F—Ph | 1 | p-Cl—Ph | 2 HNO₃ | 205–5207.5 |
| 15 | H | H | p-F—Ph | 1 | p-MeO—Ph | 2 HNO₃ | [2] 164.5–183 |
| 16 | H | H | p-F—Ph | 2 | Ph | 2 HNO₃ | 152–153.5 |
| 17 | H | H | p-F—Ph | 1 | p-Me—Ph | 2 HNO₃ | 208–209 |
| 18 | H | H | p-F—Ph | 0 | 1-tetralinyl | 2 HNO₃ | 122–136 |
| 19 | H | H | p-F—Ph | 1 | p-Cl—Ph | 2 HNO₃ | 213.5 |
| 20 | H | H | 2-thienyl | 1 | p-Cl—Ph | 2 HCl | 263.5 |
| 21 | H | H | 5-Cl-2-thienyl | 1 | p-Me—Ph | 2 HNO₃ | |
| 22 | H | H | 5-Cl-2-thienyl | 2 | Ph | 2 HCl | |
| 23 | H | H | 2-thienyl | 0 | Ph | 2 HNO₃ | |
| 24 | H | H | o,p-di-Cl—Ph | 1 | p-Me—Ph | 2 HNO₃ | |
| 25 | H | H | o-MeO—Ph | 1 | p-MeO—Ph | 2 HCl | |
| 26 | H | H | p-Br—Ph | 0 | Ph | 2 HCl | |
| 27 | Me | Me | Ph | 1 | p-Cl—Ph | 2 HNO₃ | |
| 28 | Me | Me | Ph | 1 | Ph | 2 HCl | |
| 29 | Me | Me | Ph | 0 | 1-tetralinyl | 2 HNO₃ | |
| 30 | Me | Me | Ph | 2 | Ph | 2 HCl | |
| 31 | Me | Me | Ph | 1 | p-Me—Ph | 2 HNO₃ | |
| 32 | Me | Me | Ph | 1 | p-MeO—Ph | 2 HNO₃ | |

[1] See the following table:

| | Compound name |
|---|---|
| 1 | 1-[p-chloro-β-(p-methoxybenzylamino)phenethyl]imidazole dihydrochloride. |
| 2 | 1-[β-(p-methoxybenzylamino)-p-methylphenethyl]imidazole dihydrochloride. |
| 3 | 1-(p-methyl-β-(phenethylamino)phenethyl]imidazole dinitrate. |
| 4 | 1-(β-benzylamino-p-chlorophenethyl)imidazole dihydrochloride. |
| 5 | 1-(β-anilino-p-chlorophenethyl)imidazole dihydrochloride. |
| 6 | 1-[p-chloro-β-(o-chlorobenzylamino)phenethyl]imidazole dihydrochloride. |
| 7 | 1-[p-chloro-β-(o-chlorobenzylamino)phenethyl]imidazole dinitrate. |
| 8 | 1-(p-chloro-β-(phenethylamino)phenethyl]imidazole dinitrate. |
| 9 | 1-[β-(p-methylbenzylamino)phenethyl]imidazole dihydrochloride. |
| 10 | 1-(β-(p-anisylamino)phenethyl]imidazole dihydrochloride. |
| 11 | 1-[p-chloro-β-(p-methylbenzylamino)phenethyl]imidazole dihydrochloride. |
| 12 | 1-(p-chloro-β-(1-tetralinylamino)phenethyl]imidazole dihydrochloride trihydrate. |
| 13 | 1-[β-(benzylamino-p-fluorophenethyl)imidazole dinitrate. |
| 14 | 1-[β-(o-chlorobenzylamino)-p-fluorophenethyl]imidazole dinitrate. |
| 15 | 1-[p-fluoro-β-(p-methoxybenzylamino)phenethyl]imidazole dinitrate. |
| 16 | 1-[p-fluoro-β-(phenethylamino)phenethyl]imidazole dinitrate. |
| 17 | 1-[p-fluoro-β-(p-methylbenzylamino)phenethyl]imidazole dinitrate. |
| 18 | 1-(p-fluoro-β-(1-tetralinylamino)phenethyl]imidazole dinitrate. |
| 19 | 1-[β-(p-chlorobenzylamino)p-fluorophenethyl]imidazole dinitrate. |
| 20 | 1-[2-(p-chlorobenzylamino)-2-(2-thienyl)ethyl]imidazole dihydrochloride. |
| 21 | 1-[2-(p-methylbenzylamino)-2-(5-chloro-2-thienyl)ethyl]imidazole dinitrate. |
| 22 | 1-(β-(phenethylamino)-2-(5-chloro-2-thienyl)ethyl]imidazole dihydrochloride. |
| 23 | 1-[β-anilino-2-(2-thienyl)ethyl]imidazole dinitrate. |
| 24 | 1-[o,p-dichloro-β-(p-methylbenzylamino)phenethyl]imidazole dinitrate. |
| 25 | 1-[o-methoxy-β-(p-methoxybenzylamino)phenethyl]imidazole dihydrochloride. |
| 26 | 1-(β-anilino-p-bromophenethyl)imidazole dihydrochloride. |
| 27 | 1-[β-(p-chlorobenzylamino)-α,α-dimethylphenethyl]imidazole dinitrate. |
| 28 | 1-[β-(benzylamino)-α,α-dimethylphenethyl]imidazole dihydrochloride. |
| 29 | 1-[β-(1-tetralinylamino)-α,α-dimethylphenethyl]imidazole dinitrate. |
| 30 | 1-[β-(phenethylamino)-α,α-dimethylphenethyl]imidazole dihydrochloride. |
| 31 | 1-[β-(p-methylbenzylamino)-α,α-dimethylphenethyl]imidazole dinitrate. |
| 32 | 1-[β-(p-methoxybenzylamino)-α,α-dimethylphenethyl]imidazole dinitrate. |

[2] Decomposes.

EXAMPLE XXIX

A solution of 140 parts of imidazole, 240 parts of 2-phenylethylene oxide, 400 parts of denatured absolute ethanol and 8 parts of pyridine is heated to reflux (an exothermic reaction occurs, requiring ice-bath moderation). Upon completion of the exotherm (about 15–30 minutes), the mixture is allowed to cool to 50° C. Then there are added 240 parts of diisopropylether and the whole is poured onto 1000 parts of water. The crude product is filtered off after cooling, triturated in ice-cold acetone, filtered off again, washed with ice-cold acetone and then with ether, to yield 1-(β-hydroxyphenethyl)imidazole; M.P. 149–150° C.

80 parts of 1-(β-hydroxyphenethyl)imidazole are dissolved in 250 parts of dry hexamethylphosphortriamide at about 40° C., while anti-foam is added. This solution is added, over a one hour period to 22 parts of a sodium hydride dispersion in 100 parts of dry hexamethylphosphortriamide, while cooling at 5–15° C. Upon completion, the whole is allowed to come to room temperature (about 30 minutes). After stirring for one hour at 45–50° C., the mixture is cooled to 5° C. and there is added portionwise 80 parts of p-chlorobenzyl chloride, while keeping the temperature below 25° C. The whole is stirred for 30 minutes at room temperature, further heated to 45° C. and then allowed to come to room temperature (about one hour). After the addition of 1500 parts of water, the ether product, 1-[β-(p-chlorobenzyloxy)phenethyl]imidazole, is extracted three times with ether. The combined extracts are washed with water and there is added an excess of nitric acid. After cooling, the precipitated nitrate salt is filtered off, triturated twice in 50% acetone/ether and dried in vacuo, yielding 1-[β-(p-chlorobenzyloxy)phenethyl]imidazole nitrate; M.P. 132–134° C.

EXAMPLE XXX

A suspension of 5 parts of α-chlorophenyl)imidazole-1-ethanol and 1.1 parts of sodium hydride in 27 parts of dry tetrahydrofuran is stirred and refluxed for 2 hours, after which the evolution of hydrogen is ceased. Then there are added 30 parts of dimethylformamide and 4.8 parts of p-chlorobenzylchloride and the whole is stirred and refluxed for 2 hours. The tetrahydrofuran is evaporated at atmospheric pressure and the dimethylformamide solution is poured onto water. The product is extracted with benzene. The extract is washed with water, dried, filtered and evaporated in vacuo. The residue is washed with petroleum ether. The latter is decanted and from the residual oily free base, 1-[p-chloro-β-(p-chlorobenzyloxy)phenethyl]imidazole, the nitrate salt is prepared in the usual manner from nitric acid in 2-propanol. The crude solid salt is filtered off and recrystallized from a mixture of 2-propanol and diisopropylether, yielding 1-[p-chloro-β-(p-chlorobenzyloxy)phenethyl]imidazole nitrate, M.P. 155° C.

EXAMPLE XXXI

A suspension of 8.3 parts of α-(p-fluorophenyl)-imidazole-1-ethanol and 2.1 parts of sodium hydride in 27 parts of dry tetrahydrofuran is stirred and refluxed for 2 hours after which the evolution of hydrogen is ceased. Then there are added 20 parts of dimethylformamide and the whole is stirred and refluxed for 30 minutes. After the addition of 8 parts of p-chlorobenzylchloride, stirring and refluxing is continued for another 2 hours. The tetrahydrofuran is evaporated at atmospheric pressure and the dimethylformamide solution is poured onto water. The product is extracted with benzene. The extract is washed with water, dried, filtered and evaporated in vacuo. The residue solidifies on triturating in petroleum ether. The solid product, 1-[β-(p-chlorobenzyloxy)-p-fluorophenethyl]imidazole, is recrystallized from diisopropylether, filtered off and the crude free base is converted into its nitrate salt in the usual manner in acetone and diisopropylether. The solid salt is filtered off and recrystallized from a mixture of 2-propanol, diisopropylether and acetone, yielding 1-[β-(p-chlorobenzyloxy)-p-fluorophenethyl]imidazole nitrate; M.P. 123° C.

EXAMPLE XXXII

A suspension of 10.3 parts of α-(2,4-dichlorophenyl)-imidazole-1-ethanol and 2.1 parts of sodium hydride in 50 parts of dry tetrahydrofuran is stirred and refluxed for 2 hours. After this reaction-time, the evolution of hydrogen is ceased. Then there are added successively 60 parts dimethylformamide and 8 parts of p-chlorobenzylchloride and stirring and refluxing is continued for another 2 hours. The tetrahydrofuran is removed at atmospheric pressure. The dimethylformamide solution is poured onto water. The product, 1-[2,4-dichloro-β-(p - chlorobenzyloxy)phenethyl]imidazole, is extracted with benzene. The extract is washed with water, dried, filtered and evaporated in vacuo. From the residual oily free base, the nitrate salt is prepared in the usual manner in 2-propanol by treatment with concentrated nitric acid, yielding, after recrystallization of the crude solid salt from a mixture of 2-propanol, methanol and diisopropylether, 1 - [2,4 - dichloro - β-(p-chlorobenzyloxy) phenethyl]imidazole nitrate; M.P. 162° C.

EXAMPLE XXXIII

The O-alkylation procedure of Example XXXII is repeated except that an equivalent quantity of an appropriate alcohol of Formula V and an equivalent quantity of an appropriate halide of Formula VI are substituted therein as starting materials to yield, as respective products, the following imidazole ethers of Formula I–b as the nitrate salt:

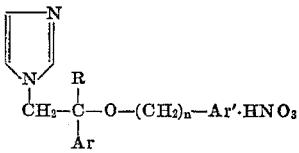

| Ether[1] | R | Ar | n | Ar' | M.P. (° C.) |
|---|---|---|---|---|---|
| 1 | H | o-Cl—Ph | 1 | p-Cl—Ph | 127 |
| 2 | H | 2,4-diCl—Ph | 1 | 2,4-diCl—Ph | 170.5 |
| 3 | H | p-F—Ph | 1 | 2,4-diCl—Ph | 120 |
| 4 | H | p-Me—Ph | 1 | 2,4-diCl—Ph | 130.5 |
| 5 | H | o-Me—Ph | 1 | 2,4-diCl—Ph | 139.5 |
| 6 | H | o-Me—Ph | 1 | p-Cl—Ph | 129.5 |
| 7 | H | p-Me—Ph | 1 | p-Cl—Ph | 121.5 |
| 8 | H | o-Cl—Ph | 1 | 2,4-diCl—Ph | 128.5 |
| 9 | H | p-Cl—Ph | 1 | 2,4-diCl—Ph | 110.5 |
| 10 | H | o-MeO—Ph | 1 | 2,4-diCl—Ph | 132 |
| 11 | Me | Ph | 1 | p-Cl—Ph | 167.5 |
| 12 | Me | Ph | 1 | 2,4-diCl—Ph | 179.5 |
| 13 | Me | p-Cl—Ph | 1 | p-Cl—Ph | 167 |
| 14 | Me | p-Cl—Ph | 1 | 2,4-diCl—Ph | 162.5 |
| 15 | H | 2,4-diCl—Ph | 1 | o-Me—Ph | 129.5 |
| 16 | H | p-Cl—Ph | 2 | Ph | -------- |
| 17 | H | o-Me—Ph | 2 | p-Cl—Ph | -------- |
| 18 | H | o-MeO—Ph | 2 | p-Me—Ph | -------- |
| 19 | Me | Ph | 2 | Ph | -------- |
| 20 | Me | p-Cl—Ph | 2 | p-MeO—Ph | -------- |
| 21 | H | p-F—Ph | 2 | 2,4-diCl—Ph | -------- |
| 22 | H | 2-thienyl | 1 | p-Me—Ph | -------- |
| 23 | H | 2-thienyl | 2 | Ph | -------- |
| 24 | H | 5-Cl-2-thienyl | 1 | o-F—Ph | -------- |
| 25 | H | 5-Cl-2-thienyl | 2 | p-MeO—Ph | -------- |
| 26 | H | o-Me—Ph | 0 | p-NO₂—Ph | -------- |

[1] See the following table:

| | Compound name |
|---|---|
| 1 | 1-[o-chloro-β-(p-chlorobenzyloxy)phenethyl]imidazole nitrate. |
| 2 | 1-[2,4-dichloro-β-(2,4-dichlorobenzyloxy)phenethyl]imidazole nitrate. |
| 3 | 1-[β-(2,4-dichlorobenzyloxy)-p-fluorophenethyl]imidazole nitrate. |
| 4 | 1-[β-(2,4-dichlorobenzyl)-p-methylphenethyl]imidazole nitrate. |
| 5 | 1-[β-(2,4-dichlorobenzyloxy)-o-methylphenethyl]imidazole nitrate. |
| 6 | 1-[β-(p-chlorobenzyloxy)-o-methylphenethyl]imidazole nitrate. |
| 7 | 1-[β-(p-chlorobenzyloxy)-p-methylphenethyl]imidazole nitrate. |
| 8 | 1-(o-chloro-β-(2,4-dichlorobenzyloxy)phenethyl]imidazole nitrate. |
| 9 | 1-[p-chloro-β-(2,4-dichlorobenzyloxy)phenethyl]imidazole nitrate. |
| 10 | 1-[β-(2,4-dichlorobenzyloxy)-o-methoxyphenethyl]imidazole nitrate. |
| 11 | 1-[β-(p-chlorobenzyloxy)-β-methylphenethyl]imidazole nitrate. |
| 12 | 1-[β-(2,4-dichlorobenzyloxy)-β-methylphenethyl]imidazole nitrate. |
| 13 | 1-[p-chloro-β-(p-chlorobenzyloxy)-β-methyl-phenethyl]imidazole nitrate. |
| 14 | 1-[p-chloro-β-(2,4-dichlorobenzyloxy)-β-methylphenethyl]imidazole nitrate. |
| 15 | 1-[2,4-dichloro-β-(o-methylbenzyloxy)phenethyl]imidazole nitrate. |
| 16 | 1-[p-chloro-β-(phenethyloxy)phenethyl]imidazole nitrate. |
| 17 | 1-[o-methyl-β-(p-chlorophenethyloxy)phenethyl]imidazole nitrate. |
| 18 | 1-[o-methoxy-β-(p-methylphenethyloxy)phenethyl]imidazole nitrate. |
| 19 | 1-[β-(phenethyloxy)phenethyl]imidazole nitrate. |
| 20 | 1-[p-chloro-β-(p-methoxyphenethyloxy)phenethyl]imidazole nitrate. |
| 21 | 1-[p-fluoro-β-(2,4-dichlorophenethyloxy)phenethyl]imidazole nitrate. |
| 22 | 1-[2-(p-methylbenzyloxy)-2-(2-thienyl)ethyl]imidazole nitrate. |
| 23 | 1-[2-(phenethyloxy)-2-(2-thienyl)ethyl]imidazole nitrate. |
| 24 | 1-[2-(5-chloro-2-thienyl)-2-(o-fluorobenzyloxy)ethyl]imidazole nitrate. |
| 25 | 1-[2-(5-chloro-2-thienyl)-2-(p-methoxyphenethyloxy)ethyl]imidazole nitrate; and |
| 26 | 1-[o-methyl-β-(p-nitrophenoxy)phenethyl]imidazole nitrate. |

EXAMPLE XXXIV

A mixture of 8.8 parts of α-(p-chlorophenyl)imidazole-1-ethanol and 2.1 parts of sodium hydride in 50 parts of dry tetrahydrofuran is stirred and refluxed for 18 hours. Then there are added 25 parts of dimethylformamide and stirring and refluxing is continued for 30 minutes. Then 8 parts of o-chlorobenzylchloride is added and the mixture is stirred at reflux for 4 hours. After the addition of 300 parts of water, the product is extracted with benzene (three times). The combined extracts are washed twice with water, dried and evaporated in vacuo. From the residual free base, 1-[p-chloro-β-(o-chlorobenzyloxy)phenethyl]imidazole, the nitrate salt is prepared in the usual manner. The precipitated solid salt is filtered off, triturated with ether and 2-propanol and further recrystallized from a mixture of 2-propanol and ether, yielding 1-[p-chloro-β-(o-chlorobenzyloxy) phenethyl]imidazole nitrate; M.P. 125° C.

EXAMPLE XXXV

By repeating the O-alkylation procedure of Example XXXIV, except that an equivalent quantity of an appropriate alcohol of Formula V and an equivalent quantity of an apropriate halide of Formula VI are substituted therein as starting materials, there are obtained, as respective products, the following ethers of Formula I-b in the form of a nitrate salt:

1-[β-(o-chlorobenzyloxy)-p-fluorophenethyl]imidazole nitrate, M.P. 95.5° C.;
1-[p-bromo-β-(p-chlorobenzyloxy)phenethyl]imidazole nitrate, M.P. 159° C.;
1-[β-(o-chlorobenzyloxy)-p-methylphenethyl]imidazole nitrate, M.P. 124.5° C.;
1-[β-(o-chlorobenzyloxy)-o-methylphenethyl]imidazole nitrate, M.P. 162.5° C.;
1-[β-(o-chlorobenzyloxy)-o-methoxyphenethyl] imidazole nitrate, M.P. 156° C.;
1-[o-chloro-β-(o-chlorobenzyloxy)phenethyl]imidazole nitrate, M.P. 161.5° C.;
1-[2,4-dichloro-β-(o-chlorobenzyloxy)phenethyl] imidazole nitrate, M.P. 151° C.;
1-[p-bromo-β-(o-chlorobenzyloxy)phenethyl]imidazole nitrate, M.P. 124.5° C.

EXAMPLE XXXVI

A mixture of 9.1 parts of α-(5-chloro-2-thienyl)-imidazole-1-ethanol and 2.1 parts of sodium hydride in 70 parts of dry tetrahydrofuran is stirred and refluxed for 4 hours. There there are added successively 25 parts of dimethylformamide and 8 parts of o-chlorobenzylchloride and stirring and refluxing is continued for 8 hours. The reaction mixture is diluted with 300 parts of water and the product is extracted three times with benzene. The combined extracts are washed with water, dried and evaporated in vacuo. From the residual free base, 1 - [2 - (o-chlorobenzyloxy) - 2 - (5-chloro-2-thienyl)ethyl]imidazole, the nitrate salt is prepared in the conventional manner in ether. The crude solid salt is filtered off, triturated in ice-cold acetone, filtered off again and recrystallized from a mixture of 2-propanol and diisopropylether, yielding 1-[2-(o-chlorobenzyloxy)-2 - (5 - chloro-2-thienyl)ethyl[imidazole nitrate; M.P. 125° C.

EXAMPLE XXXVII

To a stirred and refluxing solution of 40 parts of benzene and 35 parts of dimethylformamide (both solvents previously dried azeotropically) are added successively 1.6 parts of sodium hydride and 7.7 parts of α-(2,4 - dichlorophenyl)imidazole-1-ethanol, (cooling on ice is necessary). After the addition is complete, stirring and refluxing is continued for 30 minutes. Then there are added 7.8 parts of 2,6-dichlorobenzyl chloride and the whole is stirred at reflux for another 3 hours. The reaction mixture is poured onto water and the product 1 - [2,4 - dichloro-β-(2,6 - dichlorobenzyloxy)phenethyl]imidazole, is extracted with benzene. The extract is washed twice with water, dried, filtered and evaporated in vacuo. The base residue is dissolved in a mixture of acetone and diisopropylether and to this solution is added an excess of concentrated nitric acid solution. The precipitated nitrate salt is filtered off and recrystallized from a mixture of methanol and diisopropylether, yielding 1-[2,4 - dichloro-β-(2,6 - dichlorobenzyloxy)phenethyl] imidazole nitrate; M.P. 179° C.

EXAMPLE XXXVIII

The process of Example XXXVII is repeated except that an equivalent amount of an appropriate alcohol of Formula V and an equivalent amount of an appropriate halide of Formula VI are substituted therein as starting materials to yield, as respective products, the following ethers of Formula I-b:

1-(β-benzyloxyphenethyl)imidazole nitrate, M.P. 93° C.;
1-[2,4-dichloro-β-(m-methoxybenzyloxy)phenethyl] imidazole nitrate, M.P. 115.5° C.;
1-[2,4-dichloro-β-(o-fluorobenzyloxy)phenethyl] imidazole nitrate, M.P. 146.5° C.; and
1-[2,4-dichloro-β-(p-fluorobenzyloxy)phenethyl] imidazole nitrate, M.P. 141° C.

EXAMPLE XXXIX

A mixture of 8.8 parts of α-(p-chlorophenyl)imidazole-1-ethanol, 2.1 parts of sodium hydride and 45 parts of tetrahydrofuran is stirred and refluxed for 18 hours. Then there are added successively 7 parts of o-methylbenzyl chloride and 25 parts of dimethylformamide and stirring and refluxing is continued for another 2 hours. The reaction mixture is cooled and the product is extracted with benzene. The extract is washed four times with water, dried and evaporated. From the residual free base, 1 - [p-chloro-β-(o-methylbenzyloxy)phenethyl]imidazole, the nitrate salt is prepared in the conventional manner in ether. The precipitated solid salt is filtered off and recrystallized from a mixture of 16 parts of ethanol 95% and 80 parts of diisopropylether, yielding 1-[p-chloro-β-(o-methylbenzyloxy)phenethyl]imidazole nitrate; M.P. 140.5° C.

EXAMPLE XL

A mixture of 8.8 parts of α-(p-chlorophenyl)imidazole-1-ethanol and 2.1 parts of sodium hydride in 35 parts of 2,6-dichlorobenzyl chloride is stirred and refluxed for 18 hours. Then there are added 9.5 parts of 2,6-dichlorobenzyl chloride in 25 parts of dimethylformamide and stirring and refluxing is continued for 2 hours. The reaction mixture is cooled and the product is extracted with 80 parts of benzene. The extract is washed four times with water, dried, filtered and evaporated. From the oily free base, 1-[p-chloro-β-(2,6-dichlorobenzyloxy)phenethyl]imidazole, the nitrate salt is prepared in the conventional manner in ether. The solid salt is filtered off and recrystallized from a mixture of 16 parts of 2-propanol and 80 parts of diisopropylether, yielding 1 - [p-chloro-β-(2,6-dichlorobenzyloxy)phenethyl]imidazole nitrate; M.P. 143° C.

EXAMPLE XLI

A mixture of 8.7 parts of α-(2,4-dichlorophenyl)-imidazole-1-ethanol hydrochloride and 3.4 parts of sodium hydride in 40 parts of benzene and 35 parts of dimethylformamide is stirred while cooling on ice (solvents are previously dried azeotropically). First there are added 3 parts of manganese dioxide, followed by the addition of 8 parts of p-nitrofluorobenzene and the whole is stirred for 3 hours at room temperature. The reaction mixture is filtered over hyflo and water is added. The product is extracted with benzene. The extract is dried, filtered and evaporated in vacuo. From the residual free base, the nitrate salt is prepared in the conventional manner in acetone. The precipitated solid salt is filtered off and recrystallized from a mixture of methanol and diisopropylether, yielding 1 - [2,4-dichloro-β-(p-nitrophenoxy)phenethyl]imidazole nitrate; M.P. 167° C.

EXAMPLE XLII

To a stirred and refluxing solution of 40 parts of benzene and 35 parts of dimethylformamide (both previously dried azeotropically) are added successively 1.9 parts of sodium hydride and 7.7 parts of α-(2,4-dichlorophenyl)imidazole-1-ethanol (cooling on ice is necessary). After the addition is complete, stirring and refluxing is continued for 30 minutes. Then there are added 7.8 parts of p-methoxybenzyl chloride, and the whole is stirred at reflux for another 3 hours. The reaction mixture is poured onto water and the product is extracted with benzene. The extract is washed twice with water, dried, filtered and evaporated in vacuo. From the oily free base, the nitrate salt is prepared in the conventional manner in dry ether. The precipitated solid salt is filtered off and recrystallized from a mixture of methanol and diisopropylether, yielding 1 - [2,4-dichloro-β-(p-methoxybenzyloxy)phenethyl]imidazole nitrate; M.P. 148° C.

EXAMPLE XLIII

A mixture of 8.8 parts of α-(p-chlorophenyl)-imidazole-1-ethanol and 2.1 parts of sodium hydride in 45 parts of tetrahydrofuran is stirred and refluxed for 18 hours. Then there is added a solution of 7 parts of p-methylbenzyl chloride in 25 parts of dimethylformamide and stirring and refluxing is continued for 2 hours. The reaction mixture is cooled and diluted with 80 parts of benzene. The organic phase is separated, washed with water; dried and evaporated in vacuo. From the free base, the hydrochloride salt is prepared in the conventional manner in ether. The precipitated solid salt is filtered off and recrystallized from a mixture of 2-propanol and diisopropylether, yielding 1 - [p-chloro-β-(p-methylbenzyloxy)phenethyl]-imidazole hydrochloride hydrate; M.P. 134.5° C.

EXAMPLE XLIV

A mixture of 7.7 parts of α-(2,4-dichlorophenyl)-imidazole-ethanol and 1.7 parts of sodium hydride in 40 parts of benzene and 35 parts of dimethylformamide is stirred while cooling on ice (solvents are previously dried azeotropically). First there are added 3 parts of manganese dioxide, followed by the addition of 10.1 parts of 2,4-dinitrochlorobenzene and the whole is stirred for 3 hours at room temperature. The reaction mixture is filtered over hyflo and water is added. The product, 1-[2,4-dichloro-β-(2,4 - dinitrophenoxy)phenethyl]-imidazole, is extracted with benzene. The extract is dried, filtered and evaporated in vacuo. From the residual free base, the nitrate salt is prepared in the conventional manner in acetone. The precipitated solid salt is filtered off and recrystallized from a mixture of methanol and diisopropylether yielding 1-[2,4 - dichloro - β - (2,4-dinitrophenoxy)phenethyl]imidazole nitrate; M.P. 167.5° C.

EXAMPLE XLV

To a stirred nad refluxing mixture of 13.5 parts of iron, 10 parts of ammonium chloride and 150 parts of water are added portionwise 20 parts of 1-[2,4-dichloro-β-(p-nitrophenoxy)phenethyl]imidazole nitrate and the whole is further stirred and refluxed for 6 hours. The reaction mixture is cooled on an ice-bath and methylene chloride is added. The whole is filtered over hyflo. From the filtrate, the methylene chloride layer is separated, dried, filtered and evaporated in vacuo. The residue is recrystallized from diisopropylether, yielding 1-[β-(p-aminophenoxy)-2,4-dichlorophenethyl]-imidazole; M.P. 94° C.

EXAMPLE XLVI

A mixture of 8.6 parts of β,β-dimethyl-α-phenylimidazole-1-ethanol, 2.2 parts of sodium hydride and 45 parts of anhydrous tetrahydrofuran is stirred and refluxed for 18 hours. Then there are added successively 25 parts of dimethylformamide and 8 parts of p-chlorobenzyl chloride and stirring and refluxing is continued for 4 hours. After the addition of 300 parts of water, the product is extracted three times with ether. The combined extracts are dried, filtered and evaporated in vacuo. The oily residue is distilled, yielding 1-[β-(p-chlorobenzyloxy)-α,α-dimethylphenethyl]imidazole; B.P. 190–200° C. at 0.4 mm. pressure.

EXAMPLE XLVII

The following esters of Formula I–b, in the form of an acid addition salt, are respectively obtained as products by repeating the procedure of Example XLVI except that an equivalent quantity of an appropriate halide of Formula VI is substituted therein as a starting material and the oily base-containing residue, rather than being subjected to distillation, is converted to the indicated acid salt in the conventional manner:

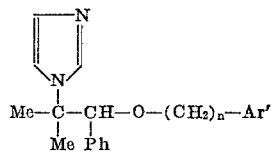

| $n$ | Ar′ | Salt |
|---|---|---|
| 1 | o-Me—Ph | HCl |
| 1 | p-F—Ph | HNO₃ |
| 1 | o,p-di-Cl—Ph | HCl |
| 1 | p-MeO—Ph | HCl |
| 1 | Ph | HNO₃ |
| 1 | Ph | HCl |
| 0 | p-NO₂—Ph | HNO₃ |
| 0 | o,p-di-NO₂—Ph | HNO₃ |
| 2 | p-Cl—Ph | HCl |

EXAMPLE XLVIII

The nitro-to-amine reduction procedure of Example XLV is repeated using an equivalent amount of each of the two nitro derivatives obtained in Example XLVII as starting materials, namely, 1-[β-(p-nitrophenoxy)-α,α-dimethylphenethyl]imidazole nitrate and 1-[β-(o,p-dinitrophenoxy) - α,α - dimethylphenethyl]imidazole nitrate, to yield, as respective products, the corresponding p-aminophenoxy and o,p-diaminophenoxy derivatives.

EXAMPLE XLIX 140 parts of p-chlorophenacylbromide are added dropwise to 250 parts of 2-methylimidazole in 500 parts of dimethylformamide at a temperature between 5° and 15° C. After the addition is complete, the whole is stirred first for two hours on ice and further overnight at room temperature. Then 2000 parts of water are added. The precipitated product is filtered off, and recrystallized twice from dimethylformamide, yielding 4′ - chloro - 2-(2-methyl-1-imidazolyl)acetophenone; M.P. 209.5° C.

EXAMPLE L

To 290 parts of 2-ethylimidazole in 500 parts of dimethylformamide are added portionwise 140 parts of p-chlorophenacylbromide, while cooling on ice (5°–15° C.). After the addition is complete, the whole is further stirred overnight and then 2000 parts of water are added. The precipitated product is filtered off and taken up in 1600 parts of toluene. Water is removed azeotropically and filtered while hot. After cooling the product is precipitated. It is filtered off and recrystallized from dimethylformamide 50%, yielding 4′-chloro-2-(2-ethyl-1-imidazolyl) acetophenone; M.P. 160° C.

EXAMPLE LI

By repeating the N-alkylation procedures of Examples XLIX and L, except that an equivalent quantity of an appropriate halide of the formula Y—CR$_1$R$_2$—CO—Ar is substituted therein as the alkylating agent, the following respective ketones of Formula II are obtained:

2',4'-dichloro-2-(2-methyl-1-imidazolyl)acetophenone;
2'-methoxy-2-(2-methyl-1-imidazolyl)acetophenone;
(5-chloro-2-thienyl)-(2-methyl-1-imidazolylmethyl) ketone;
4'-bromo-2-(2-ethyl-1-imidazolyl)acetophenone;
2-(2-ethyl-1-imidazolyl)-2'-methylacetophenone;
(2-ethyl-1-imidazolylmethyl)-(2-thienyl)ketone; and
2-(2-ethyl-1-imidazolyl)-2-methylpropiophenone.

EXAMPLE LII

To a suspension of 34 parts of 4'-chloro-2-(2-methyl-1-imidazolyl)acetophenone in 120 parts of methanol are added 1.5 parts of sodium borohydride in three portions, while cooling (5–25° C.). After the addition is complete, stirring is continued for 2 hours on ice and further for one hour at reflux temperature. Then about 80 parts of methanol are removed by evaporation. To the residue are added 300 parts of water. The aqueous phase is acidified with hydrochloric acid till pH 3, refluxed for 15 minutes and alkalized, yielding crude α-(p-chlorophenyl)-2-methyl-imidazole-1-ethanol. After recrystallization from 180 parts of 2-propanol, pure α-(p-chlorophenyl)-2-methyl-imidazole-1-ethanol is obtained; M.P. 165.5° C.

EXAMPLE LIII

To a solution of 37 parts of 4'-chloro-2-(2-ethyl-1-imidazolyl)acetophenone in 120 parts of methanol are added 1.5 parts of sodium borohydride in three portions, while cooling (5–25° C.). The whole is stirred first for 2 hours on ice and further for one hour at reflux temperature. Then about 80 parts of methanol are removed by evaporation, and 300 parts of water are added to the residue. The aqueous phase is acidified to pH 3, refluxed for 15 minutes and made alkaline, whereupon the product is precipitated. It is filtered off and recrystallized from toluene, yielding α-(p-chlorophenyl)-2-ethyl-imidazole-1-ethanol; M.P. 151.5° C.

EXAMPLE LIV

In accordance with the reduction procedures of Examples LII and LIII, except that an equivalent quantity of each of the ketones obtained in Example LI is substituted therein as the starting material, there are obtained, as respective products, the corresponding alcohols of Formula V.

EXAMPLE LV (A) To a stirred and cooled (5° C.) mixture of 2.25 parts of sodium hydride 50% in 10 parts of hexamethylphosphortriamide is added a solution of 9.6 parts of α-(p-chlorophenyl)-2-methyl-imidazole-1-ethanol in 40 parts of hexamethylphosphortriamide. Upon completion, the cooling-bath is removed and the whole is heated to 45° C. After stirring for 30 minutes at that temperature, the mixture is cooled again to 5° C. and there are added 11 parts of 2,4-dichlorobenzyl chloride. After the addition is complete, the whole is stirred overnight at room temperature and 300 parts of water are added. The product is extracted three times with 120 parts of ether. The combined extracts are washed with water, dried and there is added an excess of nitric acid. The precipitated salt is filtered off and crystallized from a mixture of 40 parts of 2-propanol and 80 parts of diisopropylether, yielding 1-[p-chloro-β-(2,4-dichlorobenzyloxy)phenethyl]-2-methylimidazole nitrate; M.P. 117° C.

(B) By substituting an equivalent quantity of 2,6-dichlorobenzyl chloride for the 2,4-dichlorobenzyl chloride used in Example LV–A, there is obtained 1-[p-chloro-β-(2,6-dichlorobenzyloxy)phenethyl] - 2 - methylimidazole nitrate; M.P. 162.5° C.

EXAMPLE LVI (A) To a stirred and cooled (5° C.) solution of 2.25 parts of sodium hydride 50% in 10 parts of hexamethylphosphortriamide is added slowly a solution of 10.5 parts of α-(p-chlorophenyl)-2-ethyl-imidazole-1-ethanol in 40 parts of hexamethylphosphortriamide. Upon completion, the whole is warmed to 45° C. and stirred at this temperature for one hour. After cooling againto 5° C., there are added 9.8 parts of 2,6-dichlorobenzylchloride and stirring is continued for 3 hours. Then 300 parts of water are added and the product is extracted three times with 120 parts of ether. The combined extracts are dried and a slight excess of nitric acid is added. The crystallized crude nitrate salt is filtered off and recrystallized from a mixture of 2-propanol and diisopropylether (1:1), yielding 1-[p-chloro-β-(2,6 - dichlorobenzyloxy)phenethyl] - 2 - ethylimidazole nitrate; M.P. 146° C.

(B) By substituting an equivalent quantity of 2,4-dichlorobenzyl chloride in the foregoing procedure of this example, there is obtained 1-[p-chloro-β-(2,4-dichlorobenzyloxy)phenethyl] - 2 - ethylimidazole nitrate; M.P. 134.5° C.

EXAMPLE LVII

The O-alkylation procedure of Example LVI is repeated, except that an equivalent amount of an appropriate alcohol obtained from Examples LII, LIII and LIV and an equivalent amount of an appropriate halide of the Formula Y—(CH$_2$)$_n$—Ar' are substituted therein as starting materials, to yield, as respective products, the following ethers of Formula I–b in the form of a nitrate salt:

1-[2,4-dichloro-β-(o-methoxybenzyloxy)phenethyl]-2-methylimidazole;
1-[2-methoxy-β-(p-methylbenzyloxy)phenethyl]-2-methylimidazole;
1-[p-chloro-β-(p-chlorobenzyloxy)phenethyl]-2-methylimidazole;
1-[2-methoxy-β-(phenethyloxy)phenethyl]-2-methylimidazole;
1-[2-(o-chlorobenzyloxy)-2-(5-chloro-2-thienyl)ethyl]-2-methylimidazole;
1-[p-chloro-β-(p-fluorobenzyloxy)phenethyl]-2-ethylimidazole;
1-[p-bromo-β-(phenoxy)phenethyl]-2-ethylimidazole;
1-[2-methyl-β-(phenethyloxy)phenethyl]-2-ethylimidazole;
1-[2-(o-chlorobenzyloxy)-2-(2-thienyl)ethyl]-2-ethylimidazole;
1-[β-(p-chlorobenzyloxy)-α,α-dimethylphenethyl]-2-ethylimidazole;
1-[p-chloro-β-(p-nitrophenoxy)phenethyl]-2-ethylimidazole; and
1-[2,4-dichloro-β-(2,4-dinitrophenoxy)phenethyl]-2-ethylimidazole.

EXAMPLE LVIII

By substituting an equivalent amount of 1-[p-chloro-β-(p-nitrophenoxy)phenethyl]-2-ethylimidazole in the nitro-to-amine reduction procedure of Example XLV, there is obtained as product 1-[p-chloro-β-(p-aminophenoxy)phenethyl]-2-ethylimidazole.

EXAMPLE LIX

The reductive amination procedure of Example XXVII is repeated, except that an equivalent amount of an appropriate ketone obtained from Examples XLIX, L and LI and an equivalent amount of an appropriate amine of the formula H$_2$N—(CH$_2$)$_n$—Ar' are substituted therein as starting materials, to yield, as respective products, the following amines of Formula I-a in the form of the dihydrochloride salt:

1-[2,4-dichloro-β-(p-methoxybenzylamino)phenethyl]-2-methylimidazole;
1-[2-methoxy-β-(phenethylamino)phenethyl]-2-methylimidazole;
1-[p-chloro-β-(o-chlorobenzylamino)phenethyl]-2-methylimidazole;
1-[2,4-dichloro-β-(p-methylbenzylamino)phenethyl]-3-methylimidazole;
1-[p-chloro-β-(1-tetralinylamino)phenethyl]-2-methylimidazole;
1-[2-methyl-β-(p-methoxybenzylamino)phenethyl]-2-ethylimidazole;
1-[p-bromo-β-(phenethylamino)phenethyl]-2-ethylimidazole;
1-[2-(p-chlorobenzylamino)-2-(2-thienyl)ethyl]-2-ethylimidazole;
1-[2-(p-methylbenzylamino)-2-(5-chloro-2-thienyl)ethyl]-2-ethylimidazole; and
1-[β-(phenethylamino)-α,α-dimethylphenethyl]-2-ethylimidazole.

EXAMPLE LX

The compositions according to this invention are employed in those forms which are customarily used for fungus or bacteria control, for example, as suspensions, dusting powders, solutions, ointments and the like. The following will further illustrate the invention, the parts being parts by weight unless otherwise specified:

(1) Suspension:
 1 kg.—1 - [β - (p-chlorobenzyloxy)phenethyl]imidazole
 2 l.—technical zylene
 350 ml.—Atlox 4855 (surface active agent—trademark of Atlas Powder Co., Wilmington, Del.)
 Water—dilute to desired concentration of active ingredient The 1 - [β - (p - chlorobenzyloxy)phenethyl]imidazole forms a stable aqueous suspension when dissolved in the xylene and emulsified by means of the surface active agent.

(2) Dusting power.—20 parts of 1-[2,4-dichloro-β-(p-chlorobenzyloxy)phenethyl]-imidazole are ground with 360 parts of talcum in a ball mill, then 8 parts of olein are added and grinding is contitnued, and finally the mixture is mixed with 4 parts of slaked lime. The powder which is formed can be sprayed satisfactorily and has good adhesive power. It can be used for dusting or for plant protection purposes.

(3) Solution.—5 parts of 1-[p-chloro-β-(2,6-dichlorobenzyloxy)phenethyl]-imidazole are dissolved in 95 parts of alkylated naphthalene and used as a spray for the treatment of fungus-infected subjects or on walls, floors or other objects to prevent infection by fungi.

(4) Ointment.—10 parts of 1-[2,4-dichloro-β-(2,4-dichlorobenzyloxy)phenethyl]imidazole nitrate are dissolved in a warm, liquefied mixture of 400 parts of polyethylene glycol 400 and 590 parts of polyethylene glycol 1500. The solution is stirred during cooling, and used as an ointment for treatment against fungi and bacteria.

EXAMPLE LXI (A) 18.7 parts of 1-[2,4-dichloro-β-(2,4-dichlorobenzyloxy)phenethyl]imidazole nitrate are suspended in 300 parts of water. The suspension is alkalized with 5 parts of sodium hydroxide solution 10 N and shaken for 5 minutes. The liberated base is extracted with chloroform (successively 115, 37.5 and 37.5 parts). The combined extracts are evaporated on a water-bath; a yellow oil is obtained, which solidifies upon dilution with about 40 parts of petroleumether. The product is filtered off and dried for 16 hours at 50° C. in vacuo, yielding 1-[2,4-dichloro-β-(2,4-dichlorobenzyloxy)phenethyl]-imidazole; M.P. 79.4° C.

(B) 7.5 parts of 1-[2,4-dichloro-β-(p-chlorobenzyloxy)phenethyl]-imidazole nitrate are alkalized with 3 parts of sodium hydroxide solution 10 N and the free base is extracted with 190 parts of chloroform. The organic phase is dried, filtered and evaporated. The residue is dried in vacuo for 2 hours at 50° C., yielding 1-[2,4-dichloro-β-(p-chlorobenzyloxy)phenethyl]imidazole; M.P. 86.8° C.

EXAMPLE LXII

To a suspension of 4.5 parts of sodium methoxide solution 30% in 15 parts of dimethylformamide and 16 parts of benzene are added 2 parts of imidazole. The solvent is distilled off till an internal temperature of 130° C. is reached. Then there is added a solution of 5.4 parts of α-(bromomethyl) - 3,4 - dichlorobenzoyl alcohol in 5.5 parts of benzene (temperature: 130° to 115° C.) and the solvent is distilled off. The temperature is brought again to 130° C. and then cooled slowly to 40° C. Diisopropylether (32 parts) is added, followed by the addition of 50 parts of water and upon cooling, the product is crystallized. It is filtered off, washed with ether and boiled for a few minutes in a mixture of 25 parts of dimethylformamide and 5 parts of water. The product is crystallized again at room temperature and separated, yielding α-(3,4 - dichlorophenyl)imidazole - 1 - ethanol; M.P. 148.7° C.

EXAMPLE LXIII

To 4.5 parts of sodium methoxide solution 30% in 15 parts of dimethylformamide and 16 parts of benzene are added 2 parts of imidazole and the solvent is distilled off till a temperature of 130° C. is reached. Then there is added dropwise a solution of 5.4 parts of α-(bromomethyl)-2,6-dichlorobenzyl alcohol in 4 parts of benzene at a temperature of 125° C. Upon completion, the temperature is brought again to 130° C. The reaction mixture is cooled gradually to 40° C. and there are added successively 50 parts of water and 32 parts of diisopropylether, whereupon the product is crystallized. It is filtered off, washed with ether, triturated in ice-cold acetone and recrystallized from a mixture of dimethylformamide and water, yielding α-(2,6-dichlorophenyl)imidazole-1-ethanol; M.P. 131.6° C.

EXAMPLE LXIV

To a solution of 4.5 parts of sodium methoxide solution 30% in 16 parts of benzene and 15 parts of dimethylformamide are added 2 parts of imidazole. The solvent is distilled off till an internal temperature of 130° C. is reached. Then there is added dropwise a solution of 5.5 parts of α-(bromomethyl)-2,5-dichlorobenzyl alcohol in 12 parts of benzene, whereupon the temperature falls to 110° C. After addition is complete, the temperature is brought again to 130° C. to remove the solvent. The reaction mixture is cooled slowly to 50° C. and there are added 100 parts of water and 40 parts of diisopropylether. On further cooling to room temperature, the product is crystallized. It is filtered off, washed successively with ether and acetone and recrystallized from a mixture of dimethylformamide and water (minimal quantities), yielding α - (2,5 - dichlorophenyl)imidazole - 1 - ethanol; M.P. 145.3° C.

EXAMPLE LXV

To a stirred and cooled solution of 3.1 parts of m-chloroacetophenone in 8 parts of dry ether and 4 parts of dioxane is added dropwise 3.2 parts of bromine, while keeping the temperature below 5° C. Upon completion, there is added dropwise a solution of 6.8 parts of imidazole in 8 parts of methanol (temperature: below 5° C.). The whole is stirred for 16 hours and then poured onto 100 parts of water, whereupon the product is crystallized. It is filtered off, taken up in a minimum of acetone and acidified with concentrated nitric acid. The precipitated nitrate salt is filtered off and recrystallized from ethanol, yielding 3'-chloro-2-(1-imidazolyl)-acetophenone nitrate; M.P. 179.7° C. Conventional treatment with alkali affords the corresponding free base.

To a stirred and cooled (ice-bath) suspension of 6.6 parts of 3'-chloro-2-(1-imidazolyl)acetophenone in 20 parts of methanol are added portionwise 0.4 part of sodium borohydride. Upon completion, stirring is continued first for one hour in an ice-bath and further for one hour at reflux temperature. The reaction mixture is acidified with hydrochloric acid and evaporated. The residue is taken up in 100 parts of boiling water, cooled alkalized with sodium hydroxide solution and upon cooling, the product is crystallized. It is filtered off, triturated in ice-cold acetone, filtered off again and recrystallized from dimethylformamide and water, yielding α-(m-chlorophenyl)imidazole-1-ethanol; M.P. 109.8° C.

EXAMPLE LXVI

To a stirred and cooled (ice-bath) suspension of 10.2 parts of imidazole in 10 parts of dimethylformamide is added portionwise a solution of 6 parts of 2-bromo-4'-chloro-2-methylpropiophenone (described in C.A. 55, 442c) in 10 parts of dimethylformamide at a temperature of 3–5° C. Upon completion, stirring is continued for 2 hours in an ice-bath. The cooling-bath is removed and the whole is stirred for 25 hours at room temperature. The reaction mixture is poured onto 250 parts of water, whereupon the product is crystallized. It is filtered off and dissolved in acetone. The solution is acidified with a concentrated nitric acid solution. The precipitated salt is filtered off and recrystallized from ethanol, yielding 4'-chloro-2-(1-imidazolyl)isobutyrophenone nitrate; M.P. 178.2° C. Conventional treatment with alkali yields the corresponding free base.

To a stirred and cooled solution of 4.5 parts of 4'-chloro-2-(1-imidazolyl)isobutyrophenone in 12 parts of methanol are added portionwise 0.4 part of sodium borohydride at a temperature of about 5° C. Upon completion, the whole is stirred first for 30 minutes in an ice-bath and then for another 30 minutes at reflux temperature. Hydrochloric acid is added till pH 3 and the whole is evaporated. The residue is taken up in 100 parts of boiling water and alkalized with sodium hydroxide solution. Upon cooling, the product is crystallized. It is filtered off and recrystallized from a mixture of dimethylformamide and water, yielding α - (p - chlorophenyl)-β,β-dimethylimidazole-1-ethanol; M.P. 187.5° C.

EXAMPLE LXVII

To a warm (50° C.) suspension of 1.8 parts of sodium hydride 50% in 36 parts of tetrahydrofuran is added dropwise a solution of 7.7 parts of α-(3,4-dichlorophenyl) imidazole-1-ethanol in 10 parts of dimethylformamide. Upon completion, the whole is stirred and refluxed for 2 hours. Then there are added 7.8 parts of 2,4-dichlorobenzyl chloride and stirring at reflux is continued for 18 hours. The reaction mixture is cooled to room temperature and 160 parts of ether are added. After stirring for 30 minutes, the ethereal phase is washed five times with water and acidified with concentrated nitric acid solution till pH 2. The precipitated solid nitrate salt is filtered off, triturated in cold acetone and filtered off again. The crude salt is taken up in a small amount of boiling methanol. About 4 parts of acetone are added, followed by the addition of diisopropylether till turbid. Upon cooling to room temperature, the crystallized salt is filtered off and dried, yielding 1 - [3,4 - dichloro - β-(2,4-dichlorobenzyloxy) phenethyl]imidazole nitrate; M.P. 142.2° C.

EXAMPLE LXVIII

To a stirred and hot (50° C.) suspension of 1.8 parts of sodium hydride 50% in 36 parts of tetrahydrofuran is added dropwise a solution of 7.7 parts of α-(3,4-dichlorophenyl)-imidazole-1-ethanol in 10 parts of dimethylformamide. Upon completion, stirring is continued for 2 hours at reflux temperature. Then there are added 7.8 parts of 2,6-dichlorobenzylchloride and the whole is stirred and refluxed for 18 hours. The reaction mixture is cooled to room temperature, 160 parts of ether are added and the whole is stirred for 15 minutes. The resulting solution is washed five times with water. To the ethereal phase is added an excess of nitric acid till pH 3. The precipitated nitrate salt is filtered off, triturated in cold acetone, filtered off again and crystallized from a mixture of ethanol and acetone, yielding 1-[3,4-dichloro-β-(2,6-dichlorobenzyloxy)phenethyl]imidazole nitrate; M.P. 158.2° C.

EXAMPLE LXIX

The O-alkylation procedure of Example LXVIII is repeated except that an equivalent quantity of an appropriate alcohol of Formula V and an equivalent quantity of an appropriate halide of Formula VI are substituted therein as starting materials to yield, as respective products, the following imidazole ethers of Formula I–b in the form of a nitrate salt:

1-[3,4-dichloro-β-(3,4-dichlorobenzyloxy)phenethyl] imidazole nitrate, M.P. 149.9° C.;
1-[2,4-dichloro-β-(3,4-dichlorobenzyloxy)phenethyl] imidazole nitrate, M.P. 177.6° C.;
1-[o-chloro-β-(3,4-dichlorobenzyloxy)phenethyl] imidazole nitrate, M.P. 140° C.;
1-[β-(3,4-dichlorobenzyloxy)-p-fluorophenethyl] imidazole nitrate, M.P. 108° C.;
1-[3,4-dichloro-β-(p-chlorobenzyloxy)phenethyl] imidazole nitrate, M.P. 138.1° C.;
1-[2,6-dichloro-β-(2,4-dichlorobenzyloxy)phenethyl] imidazole nitrate, M.P. 168.7° C.;
1-[2,6-dichloro-β-(2,6-dichlorobenzyloxy)phenethyl] imidazole nitrate, M.P. 178.7° C.;
1-[2,6-dichloro-β-(p-chlorobenzyloxy)phenethyl] imidazole nitrate, M.P. 144.6° C.;
1-[2,5-dichloro-β-(p-chlorobenzyloxy)phenethyl] imidazole nitrate, M.P. 178.5° C.;
1-[2,5-dichloro-β-(2,6-dichlorobenzyloxy)phenethyl] imidazole nitrate, M.P. 203.6° C.;
1-[2,5-dichloro-β-(2,4-dichlorobenzyloxy)phenethyl] imidazole nitrate, M.P. 173.2° C.;
1-[2,5-dichloro-β-(2,5-dichlorobenzyloxy)phenethyl] imidazole nitrate, M.P. 178.7° C.;
1-[β-(p-tert-butylbenzyloxy)-2,4-dichlorophenethyl] imidazole nitrate, M.P. 135.6° C.;
1-[2,4-dichloro-β-(p-cumenylmethoxy)phenethyl] imidazole nitrate, M.P. 133.7° C.;
1-[2,6-dichloro-β-(p-methoxybenzyloxy)phenethyl] imidazole nitrate, M.P. 144.8° C.;
1-[p-chloro-β-(2,6-dichlorobenzyloxy)-α,α-dimethylphenethyl]imidazole nitrate, M.P. 172.3° C.;
1-[p-chloro-β-(p-fluorobenzyloxy)-α,α-dimethylphenethyl]imidazole nitrate, M.P. 123.2° C.;
1-[p-chloro-β-(2,4-dichlorobenzyloxy)-α,α-dimethylphenethyl]imidazole nitrate, M.P. 119.6° C.;
1-[3,4-chloro-β-(2,4-dichlorobenzyloxy)phenethyl] imidazole nitrate, M.P. 179.2° C.;
1-[m-chloro-β-(2,6-dichlorobenzyloxy)phenethyl] imidazole nitrate, M.P. 116.6° C.; and
1-[p-chloro-β-(p-chlorobenzyloxy)-α,α-dimethylphenethyl]imidazole nitrate, M.P. 101.1° C.

EXAMPLE LXX

To a stirred and cooled (5° C.) suspension of 6 parts of 2-bromo-2',4',6'-trichloroacetophenone in 24 parts of methanol are added 0.3 part of sodium borohydride. Upon completion, the whole is stirred for one hour on an ice-bath followed by stirring for 2 hours at room temperature. The mixture is cooled again to 5° C. and another portion of 0.3 part of sodium borohydride are added portionwise. Upon completion, stirring is continued first for one hour in an ice-bath and then for one hour at room temperature. Finally, a third portion of 0.3 part of sodium borohydride is added portionwise at 5° C. and the mixture is stirred for 30 minutes in an ice-bath and for 30 minutes at room temperature. Then there is added hydrochloric acid till pH 3 and the mixture is evaporated. The residue is taken up in 200 parts of boiling water and after cooling, the solution is extracted with tetrachloromethane. The organic phase is washed with water, dried over magnesium sulfate and evaporated, yielding α-(bromomethyl)-2,4,6-trichlorobenzylalcohol.

To a solution of 4.5 parts of sodium methoxide solution 30% in 15 parts of dimethylformamide and 12 parts of benzene are added 2 parts of imidazole. The solvent is distilled off until a temperature of 130° C. is reached. Then there is added a solution of 4.5 parts of α-(bromomethyl)-2,4,6-trichlorobenzylalcohol in 4 parts of benzene (temperature lowered from 130° C. to 116° C.), while the solvent is distilled off. The solvent is further removed by heating to 130° C. and the reaction mixture is cooled gradually to 40° C. Then there are added 150 parts of water and 40 parts of diisopropylether and on further cooling, the product is crystallized. It is filtered off, triturated in ice-cold acetone and recrystallized from a mixture of dimethylformamide and water, yielding α-(2,4,6-trichlorophenyl)imidazole-1-ethanol; M.P. 151.8° C.

EXAMPLE LXXI

To a stirred and warm (50° C.) suspension of 1.8 parts of sodium hydride 50% in 36 parts of tetrahydrofuran is added portionwise a solution of 8 parts of α-(2,4,6-trichlorophenyl)imidazole-1-ethanol in 10 parts of dimethylformamide. Upon completion, the whole is stirred at reflux temperature for 2 hours. Then there are added 7.8 parts of 2,4-dichlorobenzylchloride and stirring and refluxing is continued for 17 hours. The reaction mixture is cooled to room temperature, 160 parts of ether are added and the whole is stirred for 15 minutes. The resulting solution is washed five times with water and acidified with concentrated nitric acid. The crystallized nitrate salt is filtered off, triturated in ice-cold acetone and recrystallized from a mixture of ethanol and diisopropylether, yielding 1-[2,4,6-trichloro-β-(2,4-dichlorobenzyloxy)phenethyl]imidazole nitrate; M.P. 162.9° C.

EXAMPLE LXXII (A) To a stirred and warm (50° C.) suspension of 1.8 parts of sodium hydride 50% in 36 parts of tetrahydrofuran is added portionwise a solution of 7 parts of α-(2,4,6-trichlorophenyl)imidazole-1-ethanol in 10 parts of dimethylformamide. Upon completion, stirring is continued at reflux for 2 hours. Then there are added 7.8 parts of 2,6-dichlorobenzyl chloride and the whole is stirred and refluxed for 17 hours. The reaction mixture is cooled to room temperature, 160 parts of ether are added and the whole is stirred for 15 minutes. The solution is washed five times with water and acidified with concentrated nitric acid. The crystallized nitrate salt is filtered off, triturated in ice-cold acetone and recrystallized from ethanol and diisopropylether, yielding 1-[2,4,6-trichloro-β-(2,6-dichlorobenzyloxy)phenethyl]imidazole nitrate; M.P. 180.3° C.

(B) The O-alkylation procedure of Example LXXII–A is followed except that an equivalent quantity of an appropriate halide is substituted therein as the alkylating agent to yield the following respective products:

1-[2,4,6-trichloro-β-(benzyloxy)phenethyl]imidazole nitrate;
1-[2,4,6-trichloro-β-(3,4-dimethylbenzyloxy)phenethyl] imidazole nitrate;
1-[2,4,6-trichloro-β-(p-iodobenzyloxy)phenethyl]imidazole nitrate; and
1-[2,4,6-trichloro-β-(p-cyanobenzyloxy)phenethyl]imidazole nitrate.

EXAMPLE LXXIII

To a stirred and warm suspension of 1.8 parts of sodium hydride 50% in 36 parts of tetrahydrofuran is added portionwise a solution of 7.7 parts of α-(2,4-dichlorophenyl)imidazole-1-ethanol in 10 parts of dimethylformamide at 50° C. Upon completion, stirring is continued for 1 h. 30 at reflux temperature. Then there are added 6.2 parts of 3,4-dimethylbenzyl chloride and stirring and refluxing is continued for another 15 hours. The reaction mixture is diluted with 160 parts of ether and stirred for 15 minutes. The solution is washed five times with water and acidified with an excess of concentrated nitric acid solution. The crystallized salt is filtered off and recrystallized from a mixture of ethanol and diisopropylether, yielding 1-[2,4-dichloro-β-(3,4-dimethylbenzyloxy) phenethyl]imidazole nitrate; M.P. 138.2° C.

EXAMPLE LXXIV

To a stirred and warm suspension of 1.8 parts of sodium hydride 50% in 36 parts of tetrahydrofuran is added portionwise a solution of 7.7 parts of α-(2,4-dichlorophenyl)imidazole-1-ethanol in 10 parts of dimethylformamide at 50° C. Upon completion, stirring is continued for 2 hours at reflux temperature. Then there are added 12 parts of p-iodobenzyl bromide and stirring and refluxing is continued for another 10 hours. The reaction mixture is diluted with 160 parts of ether and stirred for 15 minutes. The solution is washed five times with water and acidified with an excess of concentrated nitric acid solution. The crystallized solid salt is filtered off and recrystallized from a mixture of ethanol and diisopropylether, yielding 1-[2,4-dichloro-β-(p-iodobenzyloxy)phenethyl] imidazole nitrate; 177.6° C.

EXAMPLE LXXV

To a stirred and warm (50° C.) suspension of 1.8 parts of sodium hydride 50% in 36 parts of tetrahydrofuran is added portionwise a solution of 7.7 parts of α-(2,4-dichlorophenyl)imidazole-1-ethanol in 10 parts of dimethylformamide. Upon completion, stirring is continued for 2 hours at reflux temperature. Then there are added 8.24 parts of α-bromo-p-tolunitrile and stirring at reflux is continued for 10 hours. The reaction mixture is diluted with 160 parts of ether and stirred for 15 minutes. The solution is washed five times with water and acidified with a concentrated nitric acid solution. The crystallized salt is filtered off and recrystallized from a mixture of ethanol and diisopropylether, yielding α-[1-(2,4-dichlorophenyl)-2-(1-imidazolyl)ethoxy] - p - tolunitrile nitrate; M.P. 176.2° C.

EXAMPLE LXXVI

To a stirred and warm (50° C.) suspension of 1.8 parts of sodium hydride dispersion 50% in 36 parts of tetrahydrofuran is added portionwise a solution of 7.7 parts of α-(2,4-dichlorophenyl)imidazole-1-ethanol in 10 parts of dimethylformamide and the whole is stirred and refluxed for 2 hours. Then there are added 9.2 parts of 2,3,4-trichlorobenzyl chloride and stirring at reflux is continued for another 16 hours. Ether (160 parts) is added and the solution is washed five times with water. The organic phase is acidified with a concentrated nitric acid solution, whereupon the nitrate salt is crystallized. It is filtered off and recrystallized from a mixture of ethanol and diisopropylether, yielding 1-[2,4-dichloro-β-(2,3,4-trichlorobenzyloxy)phenethyl]imidazole nitrate; M.P. 180.5° C.

EXAMPLE LXXVII

To a stirred and warm suspension (50° C.) of 1.8 parts of sodium hydride dispersion 50% in 36 parts of tetrahydrofuran is added portionwise a solution of 7.7 parts of α-(2,4-dichlorophenyl)imidazole-1-ethanol in 10 parts of dimethylformamide and the whole is stirred and refluxed for 2 h. 30. Then there are added 9.2 parts of 2,4,6-trichlorobenzyl chloride and stirring at reflux is continued for another 17 hours. The reaction mixture is cooled to room temperature and 160 parts of ether are added. Upon stirring for 15 minutes, the solution is washed five times with water and then acidified with an excess of concentrated nitric acid solution. The crystallized solid nitrate salt is filtered off, triturated in ice-cold acetone and recrystallized from ethanol and diisopropylether, yielding 1-[2,4-dichloro-β-(2,4,6 - trichlorobenzyloxy)phenethyl]imidazole nitrate; M.P. 180.1° C.

EXAMPLE LXXVIII

The procedures described in Examples LXXIII through LXXVII illustrate a general O-alkylation technique which may be employed in preparing ethers of Formula I–b. Such ethers, obtained in the form of a nitrate salt, may be treated with alkali according to Example LXI to yield the corresponding free base form. By following such procedures, except that equivalent amounts of appropriate reactants are initially employed, the following respective products are obtained:

1-[β-(3,4-dimethylbenzyloxy)phenethyl]imidazole,
1-[β-(p-iodobenzyloxy)p-methylphenethyl]imidazole;
1-[β-(p-iodobenzyloxy)-β-methylphenyl]imidazole;
1-[β-(2-methoxy-4-nitrobenzyloxy)phenethyl]imidazole;
1-[β-(p-cyanobenzyloxy)-o-methoxyphenethyl]imidazole;
1-[β-(p-cyanobenzyloxy)-p-chlorophenethyl]imidazole; and
1-[β-(2,3,4-trichlorobenzyloxy)-o-methylphenethyl]imidazole.

EXAMPLE LXXIX

This example demonstrates a method of preparing those ketones of Formula II obtained by the alkylation of 2-4(5)-dimethylimidazole and a halide of the Formula Y—CR$_1$R$_2$—CO—Ar as the alkylating agent.

(A) 177 parts of 2-bromo-4'-chloroacetophenone are added portionwise to a cooled mixture of 350 parts of 2,4-dimethylimidazole in 700 parts of dimethylformamide (temperature between 5° and 15° C.). Upon completion, the whole is stirred for 2 hours on ice and for one additional hour at room temperature. The reaction mixture is poured onto 6000 parts of water at 50° C. and the crystallized product is filtered off. It is washed successively with water, benzene and ether and then recrystallized from toluene, yielding 4'-chloro-2-(2,4-dimethyl-1-imidazolyl)acetophenone, M.P. 185.8° C.

(B) By following the procedure of Example LXXIX-A, except that an equivalent quantity of an appropriate halide of the Formula Y—CR$_1$R$_2$—CO—Ar is substituted for the 2-bromo-4'-chloroacetophenone used therein, the following ketones of Formula II are obtained:

2-(2,4-dimethyl-1-imidazolyl)acetophenone;
4'-methyl-2-(2,4-dimethyl-1-imidazolyl)acetophenone;
2'-methoxy-2-(2,4-dimethyl-1-imidazolyl)acetophenone;
2',4'-dichloro-2-(2,4-dimethyl-1-imidazolyl)acetophenone; and
2',4',6'-trichloro-2-(2,4-dimethyl-1-imidazolyl)acetophenone.

EXAMPLE LXXX (A) 1.5 parts of sodium borohydride are added portionwise to a cooled mixture of 24.8 parts of 4'-chloro-2-(2,4-dimethyl-1-imidazolyl)acetophenone in 120 parts of methanol at 5° C. Upon completion, stirring is continued for one hour on ice and one hour at reflux temperature. Then 80 parts of methanol are evaporated off and to the residue are added 200 parts of water. The aqueous phase is acidified to pH 2 and refluxed for 10 minutes. The solution is basified again and 80 parts of diisopropylether are added. Upon seeding and cooling, the product, α-(p-chlorophenyl)-2,4-dimethylimidazole-1-ethanol, is crystallized. It is filtered off and recrystallized from a mixture of 8 parts of toluene and 24 parts of diisopropylether, M.P. 128.8° C.

(B) In accordance with the procedure of Example LXXX–A, each of the ketones obtained in Example LXXIX are reduced to the corresponding alcohol of Formula V.

EXAMPLE LXXXI (A) To a stirred and hot (50° C.) solution of 2 parts of sodium hydride 50% in 45 parts of tetrahydrofuran are added portionwise 10.04 parts of α-(p-chlorophenyl)-2,4-dimethylimidazole-1-ethanol. Upon completion, the whole is stirred and refluxed for one hour. Then there are added 10 parts of 2,4-dichlorobenzyl chloride and stirring at reflux temperature is continued for 18 hours. The reaction mixture is cooled and 240 parts of ether are added. The organic phase is washed four times with water, dried and acidified with an excess of concentrated nitric acid solution. The crystallized nitrate salt is filtered off and recrystallized from a mixture of 24 parts of ethanol and 160 parts of diisopropylether, yielding 1-[p-chloro-β-(2,4-dichlorobenzyloxy)phenethyl]-2,4 - dimethylimidazole nitrate; M.P. 145.1° C.

(B) By repeating the O-alkylation procedure of Example LXXXI–A using an equivalent quantity of each of the alcohols obtained in Example LXXX–B as the alkylating agent, the corresponding 2,4-dimethylimidazole ethers of Formula I–b are obtained.

EXAMPLE LXXXII

The reductive amination procedure of Example XXVII is repeated except that an equivalent quantity of the appropriate ketone obtained in Example LXXIX and an equivalent amount of an appropriate amine of Formula III are substituted therein as starting materials to yield, as respective products, the following imidazole amines of Formula I–a in acid addition salt form by conventional treatment with the particular acid indicated:

1-(β-anilinophenethyl)-2,4-dimethylimidazole dihydrochloride;
1-(β-phenethylamino phenethyl)-2,4-dimethylimidazole dinitrate;
1-[β-(1-tetralinylamino)-phenethyl]-2,4-dimethylimidazole dinitrate;
1-[p-chloro-β-(p-methoxybenzylamino)phenethyl]-2,4-dimethylimidazole dihydrochloride;
1-[p-chloro-β-(p-methylbenzylamino)phenethyl]-2,4,-dimethylimidazole dihydrochloride;
1-[p-methyl-β-(o-chlorobenzylamino)phenethyl]-2,4-dimethylimidazole dinitrate;
1-(β-benzylamino-o-methoxyphenethyl)-2,4-dimethylimidazole dinitrate;
1-(β-phenethylamino-o,p-dichlorophenethyl)-2,4-dimethylimidazole dinitrate; and
1-(β-benzylamino-o,m,p-trichlorophenethyl)-2,4-dimethylimidazole dinitrate.

EXAMPLE LXXXIII

To a stirred and hot (60–80° C.) solution of 155 parts of p-chloro-acetophenone in 250 parts of propylene glycol are added dropwise 160 parts of bromine and the whole is further stirred overnight. The reaction mixture is poured onto diluted sodium hydroxide solution and the product is extracted with benzene. The extract is dried and evaporated in vacuo. The oily residue is distilled, yielding 220 parts of oily 2-(bromo-methyl)-2-(p-chlorophenyl)-4-methyl-1,3-dioxolane; B.P. 131–133° C. at 1.25 mm. pressure. On triturating the distillate in 400 parts of 2-propanol while cooling, the oil solidifies. It is filtered off and recrystallized from 2-propanol, yielding 2-(bromomethyl)-2-(p-chlorophenyl)-4-methyl - 1,3 - dioxolane; M.P. 71° C.

EXAMPLE LXXXIV 37.8 parts of methyl-2-thienyl-ketone are brominated with 48 parts of bromine in 48 parts of dioxane and 96 parts of dry ether, while cooling and stirring. The solvent is removed in vacuo. To the residue is added 60 parts of ethylene glycol in 160 parts of toluene and a few crystals of p-toluenesulfonic acid. The whole is stirred and refluxed in an apparatus equipped with a watertrap for 15 hours. The reaction mixture is cooled and the toluene layer is separated, washed once with potassium carbonate solution and once with water, dried, filtered and evaporated in vacuo. The oily residue is distilled in vacuo from potassium carbonate, yielding 2-(bromomethyl)-2-(2-thienyl)-1,3-dioxolan; B.P. 95° C. at 0.6 mm. pressure.

EXAMPLE LXXXV 46.2 parts of o-chloro-acetophenone are brominated with 48 parts of bromine in 48 parts of dioxane and 96 parts of dry ether, while cooling and stirring. The solvent is removed in vacuo. To the residue is added 60 parts of ethylene glycol in 160 parts of toluene and a few crystals of p-toluenesulfonic acid. The whole is stirred and refluxed in an apparatus equipped with a water trap for 15 hours. The reaction mixture is cooled and the toluene layer is separated, washed once with potassium carbonate solution and once with water, dried, filtered and evaporated in vacuo. The oily residue is distilled in vacuo from potassium carbonate, yielding 2-(bromomethyl)-2-(o-chlorophenyl)-1,3-dioxolan; B.P. 130° C. at 0.8 mm. pressure.

EXAMPLE LXXXVI 160 parts of bromine are added portionwise to 133 parts of o-methyl-acetophenone in 250 parts of ethylene glycol at a temperature between 60–80° C. Then there are added 800 parts of benzene and water is distilled off azeotropically (18 hours). The reaction mixture is poured onto diluted sodium hydroxide solution and the product is extracted three times with benzene. The combined organic phases are washed with water, dried, filtered and evaporated in vacuo. The oily residue is distilled, yielding 2-(bromomethyl)-2-(o-tolyl)-1,3-dioxolane; B.P. 113–115° C. at 0.8 mm. pressure.

EXAMPLE LXXXVII 160 parts of bromine are added portionwise to 133 parts of p-methylacetophenone in 250 parts of ethylene glycol at a temperature between 60–80° C. Then there are added 800 parts of benzene and water is distilled off azeotropically (18 hours). The reaction mixture is poured onto diluted sodium hydroxide solution and the product is extracted with benzene. The extract is dried, filtered and evaporated. The oily residue is distilled, yielding 2-(bromomethyl)-2-(p-tolyl)-1,3-dioxolane; B.P. 135–137° C. at 2.5 mm. pressure.

EXAMPLE LXXXVIII

To a cooled (5–10° C.) solution of 150 parts of m-methoxyacetophenone in 320 parts of ether and 200 parts of dioxane are added dropwise 160 parts of bromine. After the addition is complete, 250 parts of ethylene glycol are added and the solvents are removed till an internal temperature of 150° C. is reached. Then 800 parts of benzene are added and water is distilled off azeotropically (18 hours). The reaction mixture is poured onto diluted sodium hydroxide solution and the product is extracted three times with benzene. The combined extracts are washed with water, dried, filtered and evaporated in vacuo. The oily residue is distilled in vacuo, yielding 2-(bromomethyl)-2-(m-methoxyphenyl)-1,3-dioxolane; B.P. 145–155° C. at 1.4 mm. pressure. After trituration of the distillate in 2-propanol, solid 2-(bromomethyl)-2-(m-methoxyphenyl)-1,3-dioxolane is obtained, which is recrystallized from 2-propanol; M.P. 61° C.

EXAMPLE LXXXIX

To a stirred and hot (60–80° C.) solution of 42 parts of 2,5-dichloro-acetophenone in 70 parts of ethylene glycol are added dropwise 11 parts of bromine. After the addition is complete, there are added 800 parts of benzene and water is distilled off azeotropically (18 hours). The reaction mixture is poured onto diluted sodium hydroxide solution and the product is extracted with benzene. The extract is washed with water, dried, filtered and evaporated in vacuo. The oily residue is distilled, yielding oily 2-(bromomethyl) - 2 - (2,5-dichlorophenyl)-1,3-dioxolane; B.P. 143–145° C. at 1 mm. pressure. The distillate is poured onto 80 parts of 2-propanol and, on triturating, the product solidifies. It is filtered off and recrystallized from 2-propanol, yielding 2-(bromomethyl)-2-(2,5-dichlorophenyl)-1,3-dioxolane; M.P. 61.5° C.

EXAMPLE XC

To a stirred and hot (60–80° C.) solution of 133 parts of m-methylacetophenone in 250 parts of ethylene glycol are added dropwise 160 parts of bromine and the whole is further stirred overnight. The reaction mixture is poured onto diluted sodium hydroxide solution and the product is extracted with benzene. The extract is dried and evaporated in vacuo. The residue is triturated with 400 parts of 2-propanol. The product is filtered off again and recrystallized from 2-propanol, yielding 2-(bromomethyl)-2-(m-tolyl)-1,3-dioxolane; M.P. 59° C.

EXAMPLE XCI 89.4 parts of 2,3,4-trichloroacetophenone are brominated with 64 parts of bromine in 96 parts of dioxane and 200 parts of dry ether, while cooling and stirring. The solvent is removed in vacuo. To the residue is added 120 parts of ethylene glycol in 320 parts of toluene and a few crystals of p-toluenesulfonic acid. The whole is stirred and refluxed in an apparatus equipped with a water trap for 15 hours. The reaction mixture is cooled and the toluene layer is separated, washed once with potassium carbonate solution and once with water, dried, filtered and evaporated in vacuo. The oily residue is distilled in vacuo from potassium carbonate, yielding a distillate boiling at 152° C. at 1 mm. pressure. This distillate solidifies on triturating in 2-propanol. The solid product is filtered off and recrystallized from 2-propanol, yielding 2-(bromomethyl) - 2 - (2,3,4-trichlorophenyl)-1,3-dioxolane; M.P. 59.5° C.

EXAMPLE XCII

To a stirred and hot (60–80° C.) solution of 150 parts of o-methoxyacetophenone in 250 parts of ethylene glycol are added dropwise 160 parts of bromine and the whole is further stirred overnight. The reaction mixture is poured onto diluted sodium hydroxide solution and the product is extracted with benzene. The extract is dried and evaporated in vacuo. The oily residue solidifies on triturating in 480 parts of 2-propanol. The solid product is filtered off and the mother-liquor is evaporated in vacuo. The combined fractions (solid product and residue) are recrystallized from 2-propanol, to yield 2-(bromomethyl)-2-(o-methoxyphenyl)-1,3-dioxolane; M.P. 99–100° C.

EXAMPLE XCIII 46.2 parts of m-chloro-acetophenone are brominated with 48 parts of bromine in 48 parts of dioxan and 96 parts of dry ether, while cooling and stirring. The solvent is removed in vacuo. To the residue is added 60 parts of ethylene glycol in 160 parts of toluene and a few crystals of p-toluenesulfonic acid. The whole is stirred and refluxed in an apparatus equipped with a watertrap for 15 hours. The reaction mixture is cooled and the toluene layer is separated, washed once with potassium carbonate solution and once with water, dried, filtered and evaporated in vacuo. The oily residue is distilled in vacuo from potassium carbonate, yielding 2-bromomethyl-2-(m-chlorophenyl)-1,3-dioxolan; B.P. 149° C. at 0.2 mm. pressure.

EXAMPLE XCIV 138 parts of p-fluoroacetophenone in 330 parts of ethylene glycol are brominated with 160 parts of bromine at a temperature between 75° and 80° C., while stirring. Then there are added 400 parts of benzene and a small quantity of p-toluenesulfonic acid and the whole is stirred and refluxed for 15 hours, while water is removed azeotropically by means of a watertrap. The benzene layer is separated from the ethylene glycol phase, washed with potassium carbonate solution, dried, filtered and evaporated in vacuo. The oily residue is distilled, yielding oily 2-(bromomethyl)-2-(p-fluorophenyl)-1,3-dioxolane; B.P. 114° C. at 0.3 mm. pressure.

The distillate solidifies on standing at room temperature. After recrystallization from methanol, soild 2-(bromomethyl)-2-(p-fluorophenyl)-1,3-dioxolane are obtained; M.P. 50° C.

EXAMPLE XCV

To a solution of 23 parts of sodium in 600 parts of ethanol are added 154 parts of ethyl 5-methylimidazole-4-carboxylate. Then 440 parts of ethanol are evaporated off and to the warm residue are added 1600 parts of 2-diisopropylether. Upon cooling, the sodium salt is precipitated. It is filtered off, yielding the sodium salt of ethyl 5-methylimidazole-4-carboxylate.

A mixture of 17.7 parts of ethyl 5-methylimidazole-4-carboxylate, soidum salt, 35 parts of 2-bromomethyl-2-(p-chlorophenyl)-1,3-dioxolan [described in Patel A. R., J. Pharm. Sci., 52(6), 588–592 (1963)], 22.5 parts of potassium iodide, 30 parts of dimethylformamide and 4 parts of toluene is stirred and refluxed for 12 hours. The reaction mixture is cooled and 400 parts of ether are added. The organic phase is washed three times with water, dried and an excess of concentrated nitric acid is added. The precipitated nitrate salt is filtered off and recrystallized from a mixture of 40 parts of absolute ethanol and 400 parts of diisopropylether, yielding ethyl 1-[2-(p-chlorophenyl)-1,3-dioxolan-2-ylmethyl]-5 - methylimidazole - 4-carboxylate nitrate; M.P. 130.3° C.

A mixture of 2 parts of ethyl 1-[2-(p-chlorophenyl)-1,3-dioxolan-2-ylmethyl]-5-methylimidazole-4-carboxylate nitrate and 7.5 parts of sodium hydroxide solution 10 N is stirred and refluxed for 15 minutes. Then 20 parts of water are added, followed by the addition of 4.5 parts of acetic acid, whereupon the product is precipitated. It is filtered off and recrystallized from 80 parts of ethanol, yielding 1-[2-(p-chlorophenyl)-1,3 - dioxolan - 2 - ylmethyl] - 5-methylimidazole-4-carboxylic acid; M.P. 258.3° C.

To 40 parts of paraffin oil are added portionwise 25 parts of 1-[2-(p-chlorophenyl)-1,3-dioxolan-2 - ylmethyl]-5-methylimidazole-4-carboxylic acid at 250° C. The mixture is heated to 270° C., till no more carbon dioxide is evolved. The reaction mixture is cooled and 240 parts of ether are added. The solution is filtered and to the filtrate is added an excess of concentrated nitric acid solution. The precipitated nitrate salt is filtered off and recrystallized from a mixture of 120 parts of ethanol and 340 parts of diisopropyl ether, yielding 1-[2-(p-chlorophenyl)-1,3-dioxolan-2-ylmethyl] - 5 - methylimidazole nitrate; M.P. 153.6° C.

A mixture of 13 parts of 1-[2-(p-chlorophenyl)-1,3-dioxolan-2-ylmethyl] - 5 - methylimidazole, 100 parts of acetic acid and 50 parts of dilute hydrochloric acid is stirred and refluxed for 18 hours. The solvents are evaporated off and to the residue is added successively 100 parts of water and an excess of sodium hydroxide, whereupon the product, 4'-chloro-2-(5-methyl-1 - imidazolyl)acetophenone, is precipitated. It is filtered off and recrystallized from dimethylformamide 10% (50 parts), yielding 6.5 parts of 4'-chloro-2-(5-methyl-1-imidazolyl)acetophenone; M.P. 123° C.

EXAMPLE XCVI

The procedure of Example XCV demonstrates a method of preparing the 5-methylimidazolyl ketones of formula II. By repeating such procedure, except that an equivalent quantity of each of the dioxolan derivatives obtained in Examples LXXXIV through XCIV is substituted for the 2-bromomethyl-2-(p-chlorophenyl)-1,3-dioxolan used in Example XCV, the following ketones are obtained as respective products:

(1-imidazolylmethyl)-2-thienylketone;
2'-chloro-2-(5-methyl-1-imidazolyl)acetophenone;
2'-methyl-2-(5-methyl-1-imidazolyl)acetophenone;
4'-methyl-2-(5-methyl-1-imidazolyl)acetophenone;
3'-methoxy-2-(5-methyl-1-imidazolyl)acetophenone;
2',5'-dichloro-2-(5-methyl-l-imidazolyl)acetophenone;
3'-methyl-2-(5-methyl-1-imidazolyl)acetophenone;
2',3',4'-trichloro-2-(5-methyl-1-imidazolyl)acetophenone;
2'-methoxy-2-(5-methyl-1-imidazolyl)acetophenone;
3'-chloro-2-(5-methyl-1-imidazolyl)acetophenone; and
4'-fluoro-2-(5-methyl-1-imidazolyl)acetophenone.

EXAMPLE XCVII

The procedure of Example XCV is repeated except that an equivalent quantity of each of the following known dioxolan derivatives:

2-bromomethyl-2-phenyl-1,3-dioxolan;
2-bromomethyl-2-(p-bromophenyl)-1,3-dioxolan;
2-bromomethyl-2-(p-methoxyphenyl)-1,3-dioxolan; and
2-(2-bromoisopropyl)-2-phenyl-1,3-dioxolan;

is substituted for the 2-bromomethyl-2-(p-chlorophenyl-1, 3-dioxolan used therein to yield the following respective 5-methylimidazolyl ketones of Formula II:

2-(5-methyl-1-imidazolyl)acetophenone;
4'-bromo-2-(5-methyl-1-imidazolyl)acetophenone;
4-methoxy-2-(5-methyl-1-imidazolyl)acetophenone; and
2-(5-methyl-1-imidazolyl)-2-methylpropiophenone.

EXAMPLE XCVIII (A) To a stirred and cooled suspension of 8.8 parts of 4'-chloro-2,5-methyl-1-imidazolyl)acetophenone in 80 parts of methanol is added portionwise 1 part of sodium borohydride at 5° C. Upon completion, stirring is continued first for one hour while cooling and further for one hour at reflux temperature. Then 60 parts of methanol are evaporated off and to the residue are added 200 parts of dilute hydrochloric acid solution. The whole is stirred and refluxed for 15 minutes, basified and the precipitated product, α-(p-chlorophenyl)-5-methylimidazole-1-ethanol, is filtered off. After recrystallization of the crude product from 50 parts of 25% dimethylformamide, the M.P. is 194° C.

(B) By substituting an equivalent quantity of each of the ketones obtained in Examples XCVI and XCVII in the reduction procedure of Example XCVIII–A, the corresponding 5-methylimidazolyl alcohols of Formula V are obtained as respective products.

EXAMPLE XCIX (A) To a stirred and warm mixture of 1.66 parts of sodium hydride 50% in 45 parts of tetrahydrofuran are added portionwise 7.9 parts of α-(p-chlorophenyl)-5-methylimidazole-1-ethanol at 50° C. Upon completion, stirring is continued for 3 hours at reflux temperature. Then there are added 7.3 parts of 2,4-dichlorobenzyl chloride and stirring and refluxing is continued for 5 hours. The reaction mixture is cooled and 240 parts of ether are added. The ethereal phase is washed four times with water, dried and upon the addition of an excess of concentrated nitric acid, the salt is precipitated. It is filtered off, triturated with ethyl acetate and recrystalized from a mixture of 2-propanol and diisopropylether (1:9 by volume), yielding 1 - [p-chloro-β-(2,4 - dichlorobenzyloxy)phenethyl]-5-methylimidazole nitrate; M.P. 150.7° C.

(B) By substituting an equivalent quantity of each of the 5-methyl-imidazolyl alcohols obtained in Example XCVIII–B in the O-alkylation procedure of Example XCIX–A, the corresponding 5-methylimidazole ethers of Formula I–b are obtained as respective products.

EXAMPLE C

In accordance with the reductive amination procedure of Example XXVII, except that an equivalent quantity of the appropriate 5-methylimidazolyl ketone obtained from Examples XCV through XCVII and an equivalent amount of an appropriate amine of Formula III are substituted therein as starting materials, the following respective 5-methylimidazole amines of Formula I-a are obtained in the form of an acid addition salt by conventional treatment with the particular acid indicated:

1-(β-anilinophenethyl)-5-methylimidazole dihydrochloride;
1-(β-phenethylamino-phenethyl)-5-methylimidazole dinitrate;
1-[β-(1-tetralinylamino)-phenethyl]-5-methylimidazole dinitrate;
1-[p-chloro-β-(p-methoxybenzylamino)phenethyl]-5-methylimidazole dihydrochloride;
1-[p-chloro-β-(p-methylbenzylamino)phenethyl]-5-methylimidazole dihydrochloride;
1-(β-benzylamino-o,m,p-trichlorophenethyl)-5-methyl imidazole dinitrate;
1-[2-(p-chlorobenzylamino)-2-(2-thienyl)ethyl]-5-methylimidazole dihydrochloride; and
1-[β-(benzylamino)-α,α-dimethylphenylethyl]-5-methylimidazole dihydrochloride.

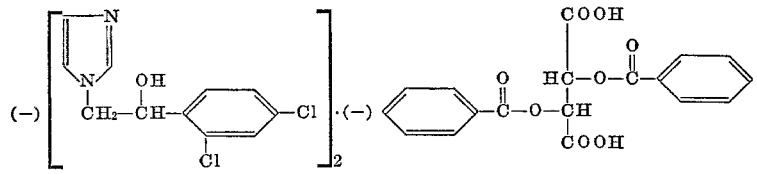

EXAMPLE CI

This example demonstrates the resolution of a typical Formula V alcohol into its optical isomers.

154.8 parts of α-(2,4-dichlorophenyl)imidazole-1-ethanol (obtained from Example XIV) are suspended in 960 parts of acetone at 50° C. The addition of 107.4 parts of dibenzoyl D-tartaric acid dissolved in 120 parts of acetone results in a one-phase system. This solution is filtered at 50° C. The temperature is allowed to fall to 20° C. (2 hours) and the product is removed by filtration (filtrate A). It is washed with 400 parts of acetone. The product consists of the diastereoisomeric salt of (+)-α-(2,4-dichlorophenyl)imidazole-1-ethanol with dibenzoyl D-tartaric acid. The compound is a one-to-one addition product, since analytical data correspond to the following structure:

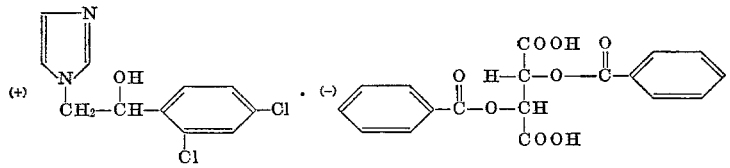

The yield of the dibenzoyl D-tartaric acid compound with (+)-α-(2,4-dichlorophenyl)imidazole-1-ethanol (1:1) amounts to 101 parts (54.3%); $\alpha_D^{20}$ —20° (c.=1, methanol). Liberation of the corresponding free base by conventional treatment of the salt with strong alkali affords 33.5 parts of (+)-α-(2,4-dichlorophenyl)imidazole-1-ethanol; M.P. 112–115.2° C. This is the dextrorotatory enantiomer, having a specific rotation of $\alpha_D^{20}$ +100° (c.=1, methanol).

The original mother-liquor (filtrate A) therefore contains 34.8 parts of (+)-α-(2,4-dichlorophenyl)imidazole-1-ethanol; 77.4 parts of (—)-α-(2,4-dichlorophenyl)imidazole-1-ethanol; and 49 parts of dibenzoyl D-tartaric acid. Acidification with 2-propanol/HCl causes deposition of the hydrochloride salts of (+)-α-(2,4-dichlorophenyl)imidazole-1-ethanol and of (—)-α-(2,4-dichlorophenyl)imidazole-1-ethanol. The yield amounts to 84 parts and the material has a specific rotation of $\alpha_D^{20}$ —18° (c.=1, methanol); therefore an excess of the (—) form with respect to the (+) form is indicated.

After filtration of the hydrochloride, the filtrate is evaporated and the residue is dissolved in water. This aqueous solution is alkalized and extracted with chloroform. The solvent is evaporated and the residue is crystallized from acetone, yielding 14 parts of (±)-α-(2,4-dichlorophenyl)imidazole-1-ethanol. The specific rotation of the latter is $\alpha_D^{20}$ —80° (c.=1, methanol). This means that this 14 parts consists of 10% of (+)-α-(2,4-dichlorophenyl)imidazole-1-ethanol and 90% of (—)-α-(2,4-dichlorophenyl)imidazole-1-ethanol (assuming —100° to be the specific rotation of the pure enantiomer).

The following manipulations describe the optical purification of this (—)-enriched fraction. Addition of 3 parts of dibenzoyl D-tartaric acid to a solution of 11 parts (taken from the above-mentioned 14 parts) in 80 parts of acetone causes deposition of a crystalline salt, consisting of dibenzoyl D-tartaric acid salt of (—)-α-(2,4-dichlorophenyl)-imidazole-1-ethanol (1:2). The specific rotation is $\alpha_D^{20}$ —100° (c.=1, methanol). This salt corresponds, upon analytical data, to the following structure:

A sample of 7 parts of this diastereoisomeric salt gives, after liberation of the free base, 3 parts of (—)-α-(2,4-dichlorophenyl)imidazole-1-ethanol; M.P. 111.4–113.4° C.; with a specific rotation of $\alpha_D^{20}$ —99° (c.=1, methanol).

EXAMPLE CII

To a stirred mixture of 10.32 parts of (+)-α-(2,4-dichlorophenyl)imidazole-1-ethanol in 75 parts of tetrahydrofuran are added portionwise 2.1 parts of sodium hydride 50% and the whole is stirred and refluxed for one hour. Then there are added 44 parts of dimethylformamide, followed by the addition of 8.7 parts of 2,4-dichlorobenzyl chloride in 22 parts of dimethylformamide. Upon completion, stirring is continued at reflux temperature for 2 hours. The tetrahydrofuran is distilled off in vacuo and the residue is poured onto 200 parts of water. The product is extracted several times with xylene (successively 160, 80 and 40 parts). The combined extracts are dried over magnesium sulfate, filtered and evaporated. The residue is dissolved in 36 parts of tetrahydrofuran and the solution is acidified with a concentrated nitric acid solution. The nitrate salt crystallizes at room temperature. It is filtered off and dried, yielding (+)-1-[2,4-dichloro-3-(2,4-dichlorobenzyloxy)phenethyl]imidazole nitrate; M.P. 135.30° C.; $\alpha_D^{20}$ +59° (c.=1, methanol).

EXAMPLE CIII

To a stirred mixture of 10.32 parts of (—)-α-(2,4-dichlorophenyl)imidazole-1-ethanol in 75 parts of tetrahydrofuran are added portionwise 2.1 parts of sodium hydride 50% and the whole is stirred and refluxed for one hour. Then there are added 44 parts of dimethylformamide, followed by the addition of 8.7 parts of 2,4-dichlorobenzyl chloride in 22 parts of dimethylformamide. Upon completion, stirring is continued at reflux temperature for 2 hours. The tetrahydrofuran is distilled off in vacuo and the residue is poured onto 200 parts of water. The product is extracted several times with xylene (successively 160, 80 and 40 parts). The combined extracts are dried over magnesium sulfate, filtered and evaporated. The residue is dissolved in 36 parts of tetrahydrofuran and the solution is acidified with a concentrated nitric acid solution. The nitrate salt crystallizes at room temperature upon the addition of 32 parts of diisopropylether. The salt is filtered off and dried, yielding (—)-1-[2,4-dichloro-$\beta$ - (2,4 - dichlorobenzyloxy)phenethyl]imidazole nitrate; M.P. 135° C.; $\alpha_D^{20}$ —58° (c.=1, methanol).

EXAMPLE CIV

The procedures of Examples LXXIX-A, LXXX-A and LXXXI-A are repeated except that an equivalent quantity of 2-ethyl-4(5)-methylimidazole [Windaus et al., Ber. 5513, 3706 (1922)] is used as the starting imidazole to yield, as the final product, 1-[p-chloro-$\beta$-(2,4-dichlorobenzyloxy)phenethyl]-2-ethyl-4-methylimidazole nitrate.

EXAMPLE CV (A) 188 parts of dl-$\alpha$-phenyl-1-imidazoleethanol are dissolved in 600 parts of 2-propanol. To this solution is added a solution of 118 parts of (+)-camphor-10-sulfonic acid monohydrate in 200 parts of 2-propanol. The formed precipitate is filtered off, yielding the crude (—)-$\alpha$-phenyl-1-imidazoleethanol - (+) - camphorsulfonate; $\alpha_D^{20}$ —11° (c.=1, methanol). (Note: the filtrate contains the (+)-$\alpha$ - phenyl - 1-imidazoleethanol (+)-camphorsulfonate). 163 parts of the crude (—)-$\alpha$-phenyl-1-imidazoleethanol (+)-camphorsulfonate are recrystallized from 1000 parts of water, yielding pure (—)-$\alpha$-phenyl-1-imidazoleethanol (+)-camphorsulfonate; $\alpha_D^{20}$ —15° (c.=1, methanol). The latter pure camphorsulfonate salt is dissolved in water and after alkalinization with ammonium hydroxide the precipitated free base is filtered off, yielding (—)-$\alpha$-phenyl-1-imidazoleethanol; M.P. 147.8–152.2° C.; $\alpha_D^{20}$ —42° (c.=1, methanol).

(B) A mixture of 5.5 parts of sodium hydride and 25 parts of hexamethylphosphoramide (previously dried over sodium hydride) is cooled to 10° C. While keeping the temperature below 15° C., there is added a solution of 20 parts of (—)-$\alpha$-phenyl-1-imidazoleethanol in 65 parts of hexamethylphosphoramide. Upon completion, the whole is stirred first for 30 minutes at room temperature and then for one hour at a temperature between 45° and 50° C. The mixture is cooled again to 5° C. and there are added 20 parts of p-chlorobenzyl chloride. After stirring for 30 minutes at room temperature, the mixture is warmed to 50° C. and further allowed to cool again to room temperature, while stirring. Then 500 parts of water are added and the product is extracted three times with toluene (respectively 240, 160 and 80 parts). The combined extracts are washed with 250 parts of water, dried over magnesium sulfate and evaporated. The residue is taken up in 40 parts of toluene and concentrated nitric acid is added. The precipitated nitrate salt is sucked off and washed with diisopropylether, yielding (—)-1-[$\beta$-(p-chlorobenzyloxy)phenethyl]imidazole nitrate with a specific rotation of $\alpha_D^{20}$ —86° (c.=1, methanol). A sample of 10 parts is recrystallized from benzene and stirred in diisopropylether, yielding 9 parts of (—)-1-[$\beta$-(p-chlorobenzyloxy)phenethyl]imidazole nitrate; M.P. 78° C.; $\alpha_D^{20}$ —85° (c.=1, methanol).

What is claimed is:

1. A chemical compound selected from the group consisting of a 1-($\beta$-aryl)ethylimidazole derivative having the formula:

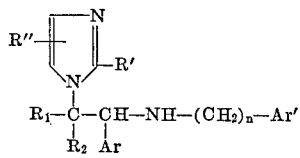

and the therapeutically active acid addition salts thereof, wherein:

$R_1$ and $R_2$ are each a member selected from the group consisting of hydrogen and lower alkyl;

$n$ is the integer zero, 1 or 2;

Ar is a member selected from the group consisting of phenyl, mono-, di- and tri-halophenyl, mono- and phenyl, lower alkoxyphenyl, thienyl and halothienyl;

Ar' is a member selected from the group consisting of phenyl, mono-, di- and tri-halophenyl, mono- and di-(lower alkyl)-phenyl, lower alkoxyphenyl, cyanophenyl, mono- and di-nitrophenyl, aminophenyl, and $\alpha$-tetralyl, provided that, when said Ar' is $\alpha$-tetralyl, then said $n$ is zero;

R' is a member selected from the group consisting of hydrogen, methyl and ethyl; and R" is a member selected from the group consisting of hydrogen and methyl.

2. A chemical compound selected from the group consisting of a 1-($\beta$-aryl)ethyl-imidazole derivative having the formula:

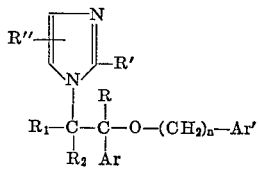

and the therapeutically active acid addition salts thereof, wherein:

R, $R_1$ and $R_2$ are each a member helected from the group consisting of hydrogen and lower alkyl;

$n$ is the integer 1 or 2;

Ar is a member selected from the group consisting of phenyl, mono-, di- and tri-halophenyl, lower alkylphenyl, lower alkoxyphenyl, thienyl and halothienyl;

Ar' is a member selected from the group consisting of phenyl, mono-, di- and tri-halophenyl, mono- and di-(lower alkyl)phenyl, lower alkoxyphenyl and cyanophenyl;

R' is a member selected from the group consisting of hydrogen, methyl and ethyl; and R" is a member selected from the group consisting of hydrogen and methyl.

3. A chemical compound selected from the group consisting of a 1-($\beta$-aryl)ethyl-imidazole derivative having the formula:

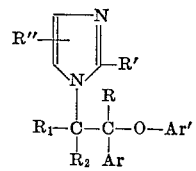

and the therapeutically active acid addition salts thereof, wherein:

R, $R_1$ and $R_2$ are each a member selected from the group consisting of hydrogen and lower alkyl;

Ar is a member selected from the group consisting of phenyl, mono-, di- and tri-halophenyl, lower alkylphenyl, lower alkoxyphenyl, thienyl and halothienyl;

Ar' is a member selected from the group consisting of mono- and di-nitrophenyl and aminophenyl;

R' is a member selected from the group consisting of hydrogen, methyl and ethyl; and R" is a member selected from the group consisting of hydrogen and methyl.

4. A chemical compound selected from the group consisting of 1-[β-(p-chlorobenzyloxy)phenethyl]imidazole and the therapeutically active acid addition salts thereof.

5. A chemical compound selected from the group consisting of 1 - [2,4 - dichloro-β-(p-chlorobenzyloxy)phenethyl]imidazole and the therapeutically active acid addition salts thereof.

6. A chemical compound selected from the group consisting of 1-[2,4-dichloro-β-(2,4-dichlorobenzyloxy)phenethyl]imidazole and the therapeutically active acid addition salts thereof.

7. A chemical compound selected from the group consisting of 1 - [2,4 - dichloro-β-(2,6-dichlorobenzyloxy)phenethyl]imidazole and the therapeutically active acid addition salts thereof.

8. A chemical compound selected from the group consisting of 1 - [p-chloro - β - (2,6-dichlorobenzyloxy)phenethyl]imidazole and the therapeutically active acid addition salts thereof.

References Cited
FOREIGN PATENTS 1,486,817   5/1967   France _____ 260—309

OTHER REFERENCES

Kajfez et al.: J. Med. Chem., vol. 11, pp. 167–9 (January 1968).

NATALIE TROUSOF, Primary Examiner

U.S. Cl. X.R.

260—332.3 H, 332.3 R, 340.9, 592; 424—273

PO-1050
(5/69)

UNITED STATES PATENT OFFICE
CERTIFICATE OF CORRECTION

Patent No. 3,717,655         Dated February 20, 1973

Inventor(s) Erik Godefroi et al

It is certified that error appears in the above-identified patent and that said Letters Patent are hereby corrected as shown below:

Column 11, line 63: "sold" should be -- "solid"--

Column 11, line 69: "kieselghur" should be -- "Kieselguhr" --.

Column 16, line 50: "pats" should be -- "parts"--

Column 17, line 11: "50" should be -- "500"--

Column 17, line 29: "Tre" should be -- "The"--

Column 31, line 11: "3 methylimidazole" should be -- "2 methylimidazole"--

Column 32, line 16: "dichlorobenzoyl" should be -- "dichlorobenzyl"--

Column 34, line 59: the "4-", first occur, should be omitted.

Column 36, line 33: "M.P." before 177.6°C has been omitted.

Column 44, line 71: "3" should read -- "B"--

Column 46, line 15: "mono-and" should read -- "lower alkyl-"--

Signed and sealed this 25th day of December 1973.

(SEAL)
Attest:

EDWARD M. FLETCHER, JR.          RENE D. TEGTMEYER
Attesting Officer                Acting Commissioner of Patents